(12) United States Patent
Lim et al.

(10) Patent No.: US 11,245,951 B2
(45) Date of Patent: Feb. 8, 2022

(54) DISPLAY DEVICE AND CONTENT PROVIDING METHOD THEREOF

(71) Applicant: SAMSUNG ELECTRONICS CO., LTD, Suwon-si (KR)

(72) Inventors: Sungmin Lim, Suwon-si (KR); Changwon Choi, Suwon-si (KR); Sumin Kim, Suwon-si (KR); Younghyun Kim, Suwon-si (KR); Youngin Park, Suwon-si (KR); Hanjin Park, Suwon-si (KR); Seockyoung Shim, Suwon-si (KR); Taehoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/959,340

(22) PCT Filed: Dec. 19, 2018

(86) PCT No.: PCT/KR2018/016180
§ 371 (c)(1),
(2) Date: Jun. 30, 2020

(87) PCT Pub. No.: WO2019/139270
PCT Pub. Date: Jul. 18, 2019

(65) Prior Publication Data
US 2021/0067825 A1    Mar. 4, 2021

(30) Foreign Application Priority Data

Jan. 9, 2018   (KR) .................. 10-2018-0002819

(51) Int. Cl.
*G06F 3/0483*    (2013.01)
*H04N 21/431*    (2011.01)
(Continued)

(52) U.S. Cl.
CPC ........ *H04N 21/431* (2013.01); *G06F 3/0482* (2013.01); *G06F 3/0483* (2013.01); *H04N 21/4782* (2013.01)

(58) Field of Classification Search
CPC   H04N 21/431; H04N 21/4782; G06F 3/0482; G06F 3/0483
See application file for complete search history.

(56) References Cited

U.S. PATENT DOCUMENTS 6,976,210 B1 * 12/2005 Silva .................. G06F 16/9577
                                                             715/205
8,055,685 B2 * 11/2011 Timmons .......... G06F 16/90335
                                                             707/803

(Continued)

FOREIGN PATENT DOCUMENTS

CN        110889072 A *   3/2020
JP        2013-171427 A    9/2013
(Continued)

OTHER PUBLICATIONS

International Search Report dated Apr. 4, 2019 in corresponding International Patent Application No. PCT/KR2018/016180.

(Continued)

*Primary Examiner* — Shen Shiau
(74) *Attorney, Agent, or Firm* — Staas & Halsey, LLP

(57) ABSTRACT

The disclosure provides a display device and a content providing method thereof. The content providing method of the display device includes: displaying a list including a plurality of web pages pre-selected by a user; and displaying, in case that a user command for selecting one of the plurality of web pages is input, a reconstructed content obtained by reconstructing the selected web page based on a type of the selected web page.

11 Claims, 50 Drawing Sheets

(a)

(b)

(c)

(d)

(51) Int. Cl.
*G06F 3/0482* (2013.01)
*H04N 21/4782* (2011.01)

(56) References Cited

U.S. PATENT DOCUMENTS

| | | | |
|---|---|---|---|
| 9,152,730 | B2 | 10/2015 | Bignert et al. |
| 9,529,931 | B2 | 12/2016 | Son |
| 10,248,858 | B2 * | 4/2019 | Ho .................. G06K 9/00469 |
| 2007/0074111 | A1 * | 3/2007 | Firshein ............... G06F 16/954 715/205 |
| 2015/0039996 | A1 | 2/2015 | Kwon |
| 2016/0335494 | A1 * | 11/2016 | Ho .................... G06K 9/00456 |
| 2017/0250768 | A1 | 8/2017 | Moshtaha et al. |
| 2017/0277661 | A1 * | 9/2017 | Lee ..................... G06F 3/04842 |
| 2017/0308271 | A1 | 10/2017 | Li |
| 2019/0197306 | A1 * | 6/2019 | Ho ..................... G06F 40/174 |
| 2019/0228106 | A1 * | 7/2019 | Dickerson ........... G06F 16/9577 |

FOREIGN PATENT DOCUMENTS

| | | |
|---|---|---|
| KR | 10-2003-0012276 A | 2/2003 |
| KR | 10-0383815 B1 | 5/2003 |
| KR | 10-0798538 B1 | 1/2008 |
| KR | 10-0817582 B1 | 3/2008 |
| KR | 10-2011-0112397 A | 10/2011 |
| KR | 10-1299670 B1 | 8/2013 |
| KR | 10-2013-0131160 A | 12/2013 |
| KR | 10-2014-0035022 A | 3/2014 |
| KR | 10-1368960 B1 | 3/2014 |
| KR | 10-2014-0106064 A | 9/2014 |
| KR | 10-2015-0003960 A | 1/2015 |
| KR | 10-1526491 B1 | 6/2015 |
| KR | 10-2015-0083589 A | 7/2015 |
| KR | 10-1532427 B1 | 7/2015 |
| KR | 101532427 B1 * | 7/2015 |
| KR | 10-2016-0046725 A | 4/2016 |
| KR | 10-2016-0102843 A | 8/2016 |
| KR | 10-1649822 B1 | 8/2016 |
| WO | WO 02/08948 A2 | 1/2002 |
| WO | WO 2010/078475 A2 | 7/2010 |
| WO | WO-2019139270 A1 * | 7/2019 ......... H04N 21/4782 |

OTHER PUBLICATIONS

Written Opinion of the International Searching Authority dated Apr. 4, 2019 in corresponding International Patent Application No. PCT/KR2018/016180.

* cited by examiner

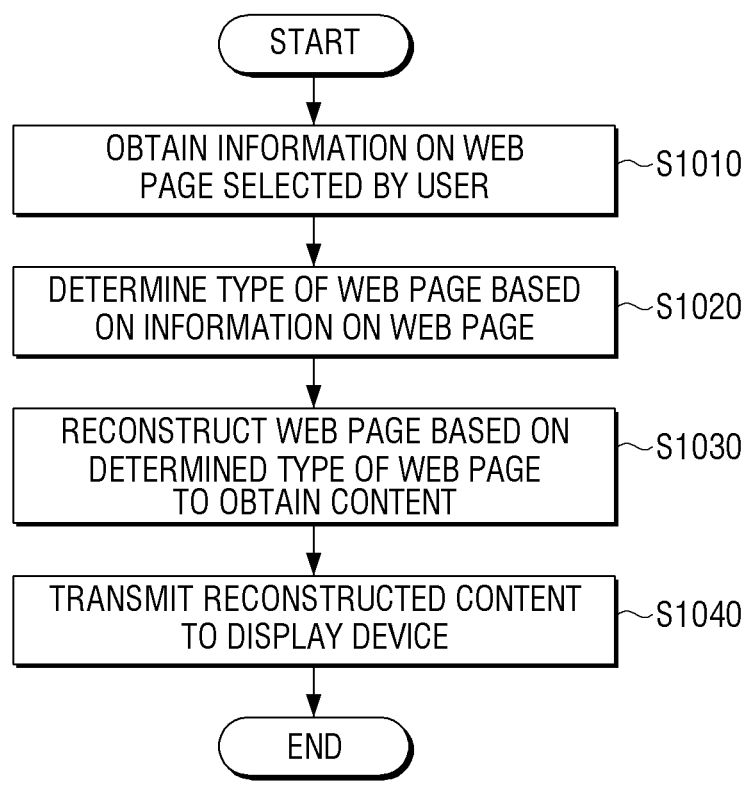

FIG. 16
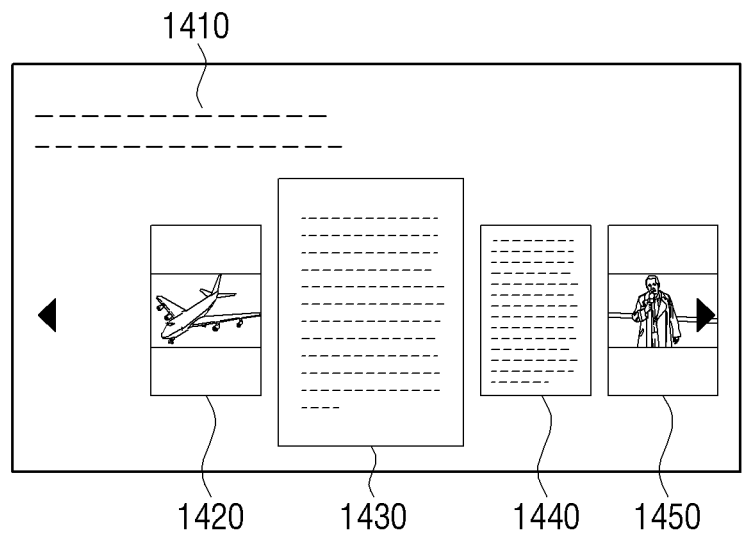
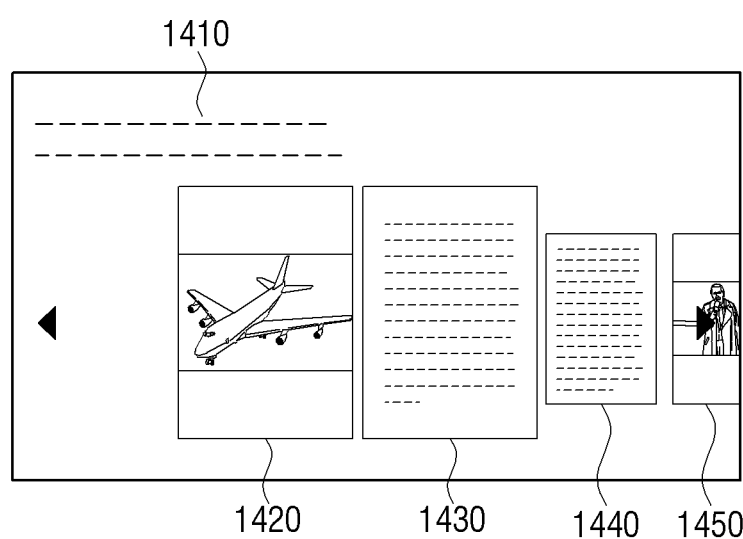
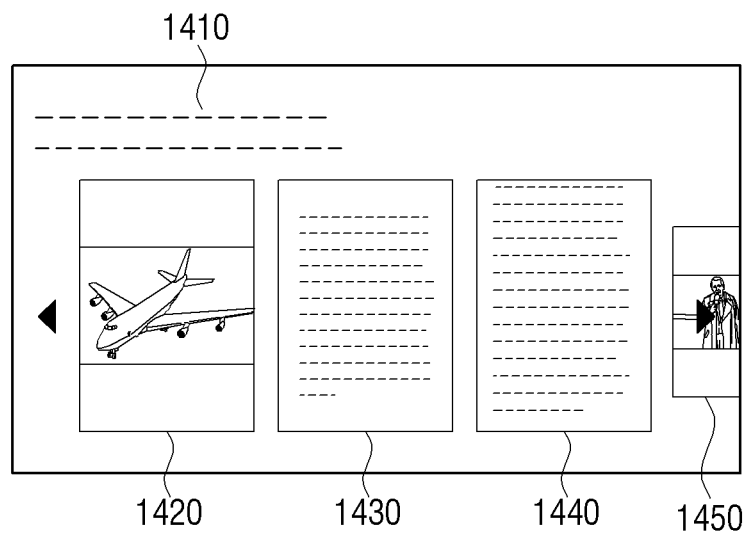

(a)                      (b)

2010

2020

FIG. 26
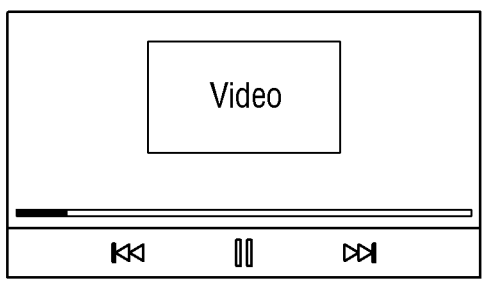
(a)
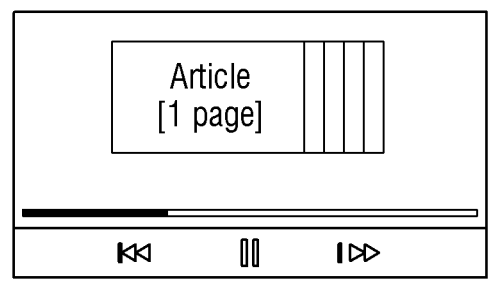
(b)
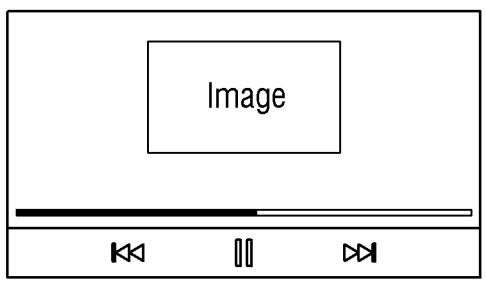
(c)
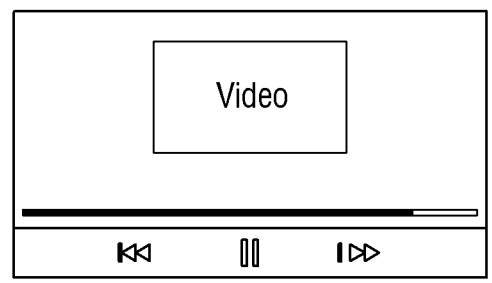
(d)

DISPLAY DEVICE AND CONTENT PROVIDING METHOD THEREOF

CROSS-REFERENCE TO RELATED APPLICATIONS

This application is a U.S. National Stage Application which claims the benefit under 35 U.S.C. § 371 of International Patent Application No. PCT/KR2018/016180 filed on Dec. 19, 2018, which claims foreign priority benefit under 35 U.S.C. § 119 of Korean Patent Application No. 10-2018-0002819 filed on Jan. 9, 2018 in the Korean Intellectual Property Office, the contents of both of which are incorporated herein by reference.

TECHNICAL FIELD

The disclosure relates to a display device and a content providing method thereof, and more particularly, to a display device capable of reconstructing a web page selected by a user based on the type of the web page and providing the reconstructed web page to the user, and a content providing method thereof.

BACKGROUND ART

Recently, it is possible to access various contents through Internet. For example, a user may access a web page to be provided with various contents such as article contents, video contents, and image contents.

However, the web page also includes an element such as an advertisement element or a pop-up element in addition to the article contents, video contents, and image contents. That is, in case that the user accesses the web page to be provided with the contents, even elements that the user does not want to view are provided together, which is problematic.

In addition, in case that the web page is provided without considering various attributes (for example, the size of a display screen or resolution) of a display device, it may be difficult to read contents included in the web page.

DISCLOSURE

Technical Problem

The disclosure has been made in an effort to solve the above-described problem, and an object of the disclosure is to provide a display device capable of providing an optimized content by reconstructing a web page selected by a user based on the type of the web page and providing the reconstructed web page to the user, and a content providing method thereof.

Technical Solution

According to an embodiment of the disclosure, a content providing method of a display device includes: displaying a list including a plurality of web pages pre-selected by a user; and displaying, in case that a user command for selecting one of the plurality of web pages is input, a reconstructed content obtained by reconstructing the selected web page based on a type of the selected web page.

The type of the selected web page may be determined depending on a domain of the selected web page.

In case that the type of the selected web page is an article web page, the reconstructed content may include a plurality of pages obtained by reconstructing elements of the selected web page based on at least one of a type or a content of the elements included in the selected web page.

Each of the plurality of pages may include at least one type of element among a text element, an image element, and a video element included in the selected web page, and in case that a plurality of types of elements are included in one page, the plurality of elements included in the one page may include relevant contents.

In case that the type of the selected web page is an image web page or a video web page, the reconstructed content may include an image element or a video element extracted based on a source address of the image element or the video element among elements included in the image web page or the video web page.

The reconstructed content may include a plurality of pages obtained by reconstructing elements related to an article among elements included in the web page, except for an advertisement element and a pop-up element.

The content providing method may further include sequentially displaying, in case that at least two of the plurality of web pages are selected, at least two reconstructed contents corresponding to the at least two selected web pages.

In the sequentially displaying of the at least two reconstructed contents, a control menu for controlling reproduction of the at least two reconstructed contents may be displayed together in one region of a display screen while the at least two reconstructed contents are sequentially output.

In case that the plurality of selected web pages include an article web page, a reproduction time of each of a plurality of pages included in a reconstructed content corresponding to the article web page may be determined depending on the number of characters in a text of each of the plurality of pages.

According to another embodiment of the disclosure, a display device includes: a display; an inputter; a memory including at least one instruction; and a processor configured to be connected to the display, the inputter, and the memory to control the display device, wherein the processor is configured to control the display to display a list including a plurality of web pages pre-selected by a user by executing the at least one instruction, and to control the display to display, in case that a user command for selecting one of the plurality of web pages is input through the inputter, a reconstructed content obtained by reconstructing the selected web page based on a type of the selected web page.

The type of the selected web page may be determined depending on a domain of the selected web page.

In case that the type of the selected web page is an article web page, the reconstructed content may include a plurality of pages obtained by reconstructing elements of the selected web page based on at least one of a type or a content of the elements included in the selected web page.

Each of the plurality of pages may include at least one type of element among a text element, an image element, and a video element included in the selected web page, and in case that a plurality of types of elements are included in one page, the plurality of elements included in the one page may include relevant contents.

In case that the type of the selected web page is an image web page or a video web page, the reconstructed content may include an image element or a video element extracted based on a source address of the image element or the video element among elements included in the image web page or the video web page.

The reconstructed content may include a plurality of pages obtained by reconstructing elements related to an article among elements included in the web page, except for an advertisement element and a pop-up element.

In case that at least two of the plurality of web pages are selected through the inputter, the processor may control the display to sequentially display at least two reconstructed contents corresponding to the at least two selected web pages.

The processor may control the display to display a control menu for controlling reproduction of the at least two reconstructed contents in one region of a display screen while the at least two reconstructed contents are sequentially output.

In case that the plurality of selected web pages include an article web page, a reproduction time of each of a plurality of pages included in a reconstructed content corresponding to the article web page may be determined depending on the number of characters in a text of each of the plurality of pages.

According to another embodiment of the disclosure, a content reconstruction method of a server includes: obtaining information on a web page selected by a user; obtaining a reconstructed content by determining a type of the web page based on the information on the web page and reconstructing the web page based on the determined type of the web page; and transmitting the reconstructed content to a display device.

Advantageous Effects

As described above, as various types of web pages are integrally provided and a reconstructed web page is provided to the user, it is possible not only to improve convenience of the user, but also to provide a new user experience.

DESCRIPTION OF DRAWINGS

FIG. 10 is a flowchart for describing a content reconstruction method of the server according to an embodiment of the disclosure.

FIGS. 13 to 26 are views for describing methods in which the display device provides a reconstructed content according to various embodiments of the disclosure.

BEST MODE

Figure 1:
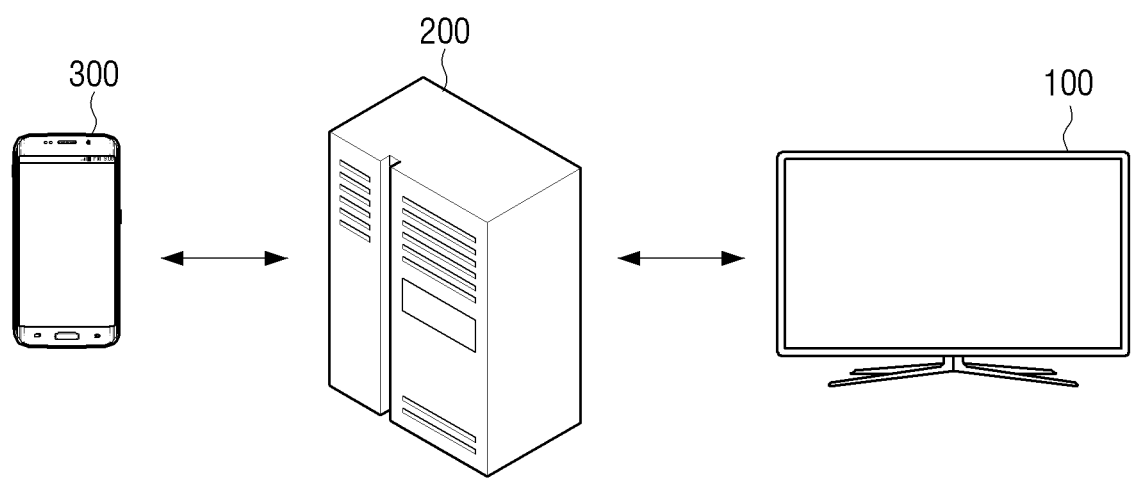
FIG. 1 illustrates a system for providing a reconstructed content according to an embodiment of the disclosure.

After terms used in the specification are briefly described, the disclosure will be described in detail.

General terms that are currently widely used were selected as terms used in embodiments of the disclosure in consideration of functions in the disclosure, but may be changed depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in embodiments of the disclosure should be defined on the basis of the meaning of the terms and the contents throughout the disclosure rather than simple names of the terms.

Since the disclosure may be variously modified and have several embodiments, specific embodiments of the disclosure will be illustrated in the drawings and be described in detail in the detailed description. However, it is to be understood that the disclosure is not limited to specific embodiments, but includes all modifications, equivalents, and substitutions without departing from the scope and spirit of the disclosure. In a case where it is decided that a detailed description for the known art related to the disclosure may obscure the gist of the disclosure, the detailed description will be omitted.

Terms "first", "second", and the like, may be used to describe various components, but the components are not to be construed as being limited by these terms. The terms are used only to distinguish one component from another component.

Singular forms used herein are intended to include plural forms unless context explicitly indicates otherwise. It will be further understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

In embodiments of the disclosure, a "modcule" or a "-er/or" may perform at least one function or operation, and be implemented by hardware or software or be implemented by a combination of hardware and software. In addition, a plurality of "modules" or a plurality of "-ers/ors" may be integrated in at least one module and be implemented by at least one processor (not illustrated) except for a "module" or a "-er/or" that needs to be implemented by specific hardware.

In embodiments of the disclosure, a case in which any portion is referred to as being "connected to" another portion not only includes a case in which any one portion and another portion are "directly connected to" each other, but also a case in which any one portion and another portion are "electrically connected to" each other with the other portion interposed therebetween. Unless explicitly described to the contrary, "including" any component will be understood to imply the inclusion of other components rather than the exclusion of other components.

Hereinafter, embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted to obviously describe the disclosure, and similar portions will be denoted by similar reference numerals throughout the specification.

FIG. 1 illustrates a system for providing a reconstructed content according to an embodiment of the disclosure. As illustrated in FIG. 1, a system 10 may include a display device 100, a server 200, and a mobile device 300. Here, the display device 100 may be a smart television (TV). However, this is only an example, and the display device 100 may be a display device such as a digital TV, a desktop personal computer (PC), or a kiosk. In addition, the mobile device 300 may be a smartphone. However, this is only an example, and the mobile device 300 may be a mobile device such as a tablet PC, a wearable device (for example, a smart watch), a laptop PC, or a personal digital assistant (PDA).

The mobile device 300 may display a web page (or a web content). Alternatively, the mobile device may display a plurality of display items linked to a plurality of web pages. Here, the web page may include elements such as various types of web contents (for example, article contents, video contents, and image contents), and may include various additional elements such as an advertise element and a pop-up element, in addition to the web content.

The mobile device 300 may receive a user command for selecting a web page. Here, the user command for selecting a web page may be a user command that bookmarks or stores a web page to view the web page through another display device later. Here, the user command may be a user command that selects a predetermined icon displayed on a web page, but this is only an example. The user command may be various user commands such as a user command that selects an address of a web page and a user speech command that includes a predetermined word during displaying of a web page.

Once the user command for selecting a web page is input, the mobile device 300 may transmit information on the web page to the server 200. Here, the information on the web page may include uniform resource locator (URL) information of the web page.

The server 200 may determine the type of the web page based on the received information on the web page. Here, the type of the web page may include an article web page including an article content, a video web page including a video content, an image web page including an image content, and the like, but is not limited thereto.

The server 200 may reconstruct the web page based on the determined type of the web page to obtain a reconstructed content. For example, in case that the type of the selected web page is the article web page, the server 200 may obtain a reconstructed content including a plurality of pages obtained by reconstructing elements of the selected web page based on at least one of the type or the content of the elements included in the selected web page. Alternatively, in case that the type of the selected web page is the image web page or the video web page, the server 200 may obtain a reconstructed content including an image element or video element extracted based on a source address of the image element or video element among elements included in the image web page or video web page.

In case that a signal for requesting the reconstructed content is received from the display device 100, the server 200 may transmit the obtained reconstructed content to the external display device 100.

The display device 100 may provide the reconstructed content obtained by reconstructing the web page selected by the user. Specifically, the display device 100 may display a list including one or more web pages selected by the user. Once a user command for selecting one of the one or more web pages is input, the display device 100 may transmit, to the server 200, a signal for requesting a reconstructed content corresponding to the selected web page. The display device 100 may provide the reconstructed content corresponding to the selected web page, the reconstructed content being received in response to the request signal.

Meanwhile, although the case that the web page is selected in the mobile device 300 has been described in the embodiment described above, this is only an example and the web page may be selected in the display device 100.

Further, although the case that the server 200 obtains (or generates) the reconstructed content corresponding to the web page has been described in the embodiment described above, this is only an example and the display device 100 may directly obtain the reconstructed content corresponding to the web page. That is, the operation of the server 200 for obtaining the reconstructed content described with reference to FIG. 1 may be performed by the display device 100.

Figure 2A:
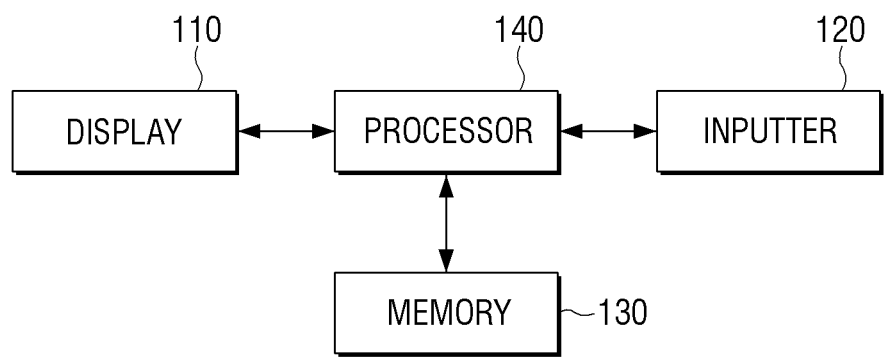
FIGS. 2a and 2b are block diagrams illustrating a configuration of a display device according to an embodiment of the disclosure.

FIG. 2a is a block diagram schematically illustrating a configuration of the display device according to an embodiment of the disclosure. As illustrated in FIG. 2a, the display device 100 may include a display 110, an inputter 120, a memory 130, and a processor 140. Meanwhile, the configuration of the display device 100 illustrated in FIG. 2a is only an example, and is not necessarily limited to that in the block diagram of FIG. 2a. Therefore, a part of the configuration of the display device 100 illustrated in FIG. 2a may be omitted, modified, or added depending on the type of the display device 100 or a purpose of the display device 100.

The display 110 may display various images received from the outside or stored in the display device 100. Further, the display 110 may display user interfaces (UIs) together with the images. Particularly, the display 110 may display a list including a plurality of web pages pre-selected by the user. Further, the display 110 may provide a reconstructed content corresponding to a web page selected by the user among the plurality of web pages.

The display 110 may be implemented by various types of display panels. For example, the display panel may be implemented by various display technologies such as a liquid crystal display (LCD) technology, an organic light emitting diode (OLED) technology, an active-matrix organic light emitting diode (AM-OLED) technology, a liquid crystal on silicon (LcoS) technology, and a digital light processing (DLP) technology. Further, the display 110 may be implemented by a touch screen having a layer structure by combining with a touch sensor. The touch screen may have a function of detecting a touch input position, a touch area, and a touch input pressure, in addition to a display function, and may also have a function of detecting not only a substantial real-touch, but also a proximity touch.

The inputter 120 may sense various user inputs. The inputter 120 may sense a user input for selecting at least one of the plurality of web pages displayed on the display 110. Here, the inputter 120 may be implemented by a component that senses a signal of a remote controller, but this is only an example. The inputter 120 may be implemented by various input devices such as a touch sensor and a button.

The memory 130 may store various programs and data required for an operation of the display device 100. The memory 130 may be implemented by a non-volatile memory, a volatile memory, a flash memory, a hard disk drive (HDD), a solid state drive (SDD), or the like. The memory 130 is accessed by the processor 140, and reading, recording, correction, deletion, update, and the like, of data in the memory 130 may be performed by the processor 140. In the disclosure, the term "memory" may include the memory 130, a read only memory (ROM) 142 and a random access memory (RAM) 141 in the processor 140, and a memory card (not illustrated) (for example, a micro secure digital (SD) card or a memory stick) mounted in the display device 100. Further, the memory 130 may store a program, data, or the like, for configuring various screens to be displayed on a display region of the display 110.

Further, the memory 130 may store an application that provides a reconstructed content for a web page selected by the user.

The processor 140 may control the general operation of the display device 100 using various programs stored in the memory 130. Particularly, the processor 140 may control the display 110 to display the list including the plurality of web pages pre-selected by the user by executing at least one instruction stored in the memory 130, and may control, once the user command for selecting one of the plurality of web pages is input through the inputter 120, the display 110 to display a reconstructed content obtained by reconstructing the selected web page based on the type of the selected web page. Here, the type of the selected web page may be determined depending on a domain of the selected web page.

According to an embodiment of the disclosure, in case that the type of the selected web page is the article web page, the reconstructed content may include a plurality of pages obtained by reconstructing elements of the selected web page based on at least one of the type or the content of the elements included in the selected web page. Here, each of the plurality of pages includes at least one type of element among a text element, an image element, and a video element included in the selected web page, and in case that a plurality of types of elements are included in one page, the plurality of elements included in one page may include relevant contents.

According to another embodiment of the disclosure, in case that the type of the selected web page is the image web page or the video web page, the reconstructed content may include an image element or video element extracted based on a source address of the image element or video element among elements included in the image web page or video web page.

Alternatively, the reconstructed content may include a plurality of pages obtained by reconstructing elements related to an article among elements included in the web page, except for an advertisement element and a pop-up element. That is, the reconstructed content may be generated by using only a content that the user wants to view among contents included in the web page.

Further, in case that at least two of the plurality of web pages are selected through the inputter 120, the processor 140 may control the display 110 to sequentially display at least two reconstructed contents corresponding to the at least two selected web pages. Here, the processor 140 may control the display 110 to display a control menu (for example, a progress bar and a play/stop icon) for controlling reproduction of the at least two reconstructed contents in one region of a display screen while the at least two reconstructed contents are sequentially output. Further, in case that the plurality of selected web pages include the article web page, a reproduction time of each of a plurality of pages included in a reconstructed content corresponding to the article web page may be determined depending on the number of characters in a text of each of the plurality of pages.

A specific embodiment in which the processor 140 provides the reconstructed content will be described in detail with reference to FIGS. 13 to 26.

Figure 2B:
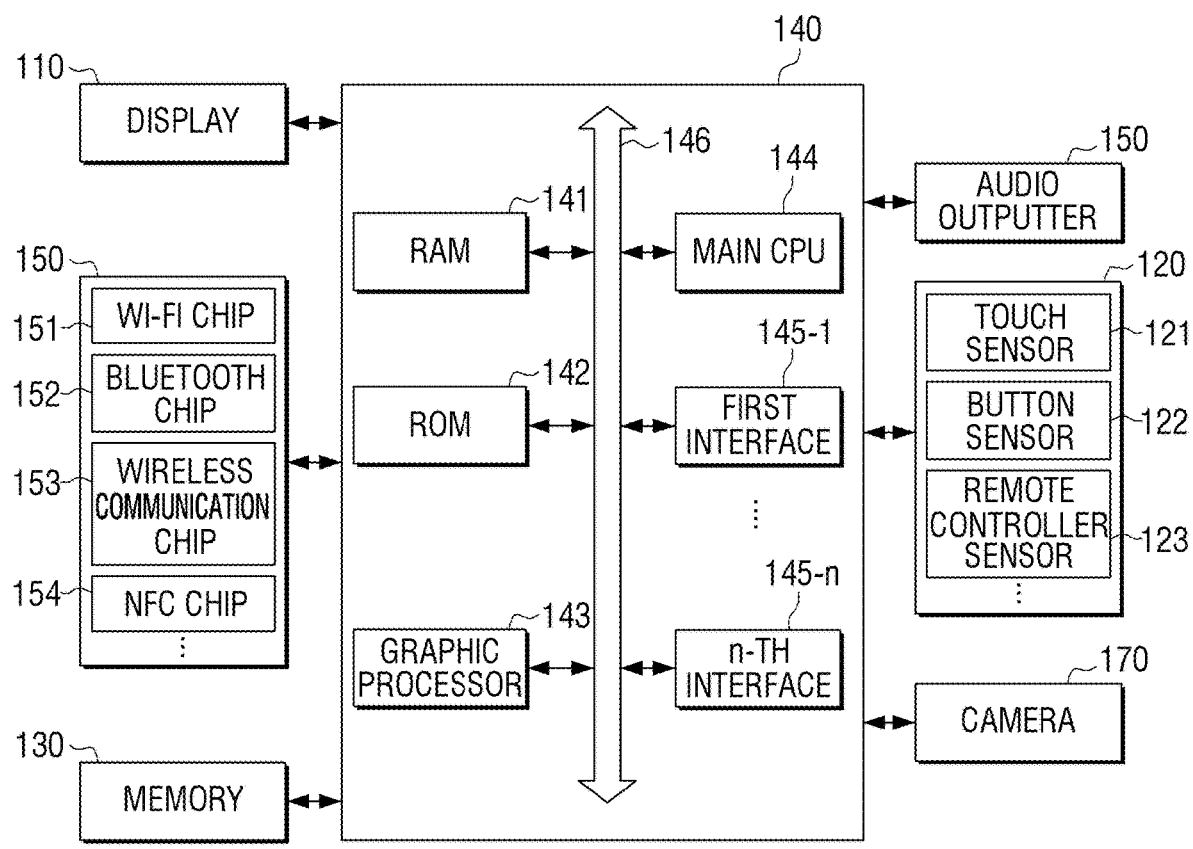

FIG. 2b is a block diagram illustrating a configuration of the display device 100 according to an embodiment of the disclosure in detail. As illustrated in FIG. 2b, the display device 100 may include the display 110, the inputter 120, the memory 130, the processor 140, a communicator 150, an audio outputter 160, and a camera 170. Meanwhile, the display 110, the inputter 120, the memory 130, and the processor 140 have been described with reference to FIG. 2a, and thus an overlapping description will be omitted.

The communicator 150 is a component for performing communication with various types of external devices according to various types of communication methods. The communicator 150 may include at least one of a wireless fidelity (Wi-Fi) chip 151, a Bluetooth chip 152, a wireless communication chip 153, or a near field communication (NFC) chip 154. The processor 140 may perform communication with an external server or various external devices by using the communicator 150.

In particular, the Wi-Fi chip 151 and the Bluetooth chip 152 may perform communication by a Wi-Fi method and a Bluetooth method, respectively. In case of using the Wi-Fi chip 151 or the Bluetooth chip 152, various connection information such as a service set identifier (SSID) and a session key may be first transmitted and received to establish communication connection, and then various information may be transmitted and received. The wireless communication chip 153 refers to a chip performing communication according to various communication protocols such as IEEE, Zigbee, 3rd generation (3G), 3rd generation partnership project (3GPP), and long term evolution (LTE). The NFC chip 154 refers to a chip operated by an NFC method using a frequency band of 13.56 MHz among various RF-ID frequency bands such as 135 kHz, 13.56 MHz, 433 MHz, 860 to 960 MHz, and 2.45 GHz.

Meanwhile, the communicator 150 may transmit, to the external server 200, a signal for requesting the reconstructed content corresponding to the selected web page. Further, the communicator 150 may receive, from the external server 200, the reconstructed content corresponding to the selected web page. According to another embodiment, the communicator 150 may directly obtain information on the web page from the mobile device 300.

The audio outputter 160 is a component that outputs various alarm sounds or voice messages, in addition to various audio data subjected to various processing such as decoding, amplification, and noise filtering by an audio processor (not illustrated). In particular, the audio outputter 160 may be implemented by a speaker, but this is only an example. The audio outputter 160 may be implemented by an output terminal that may output audio data.

The inputter 120 may receive a user command for controlling the display device 100. In particular, the inputter 120 may be divided into a touch sensor 121, a button sensor 122, and a remote controller signal sensor 123 based on a sensing purpose, but the disclosure is not limited thereto. The inputter 120 may be divided based on various purposes. Further, the division is not limited to a physical division, and one or more sensors may be combined to serve as the sensors 121 to 123. Alternatively, some of components or functions of the inputter 120 may be included in the processor 140 depending on an implementation method.

The camera 170 may obtain an image by photographing a region in front of the display device 100. In particular, the camera 170 may obtain an image for sensing a motion, a location, and the like of the user. Here, the camera 170 may be disposed in an upper bezel region of the display device 100, but this is only an example. The camera 170 may be disposed outside the display device 100 and electrically connected to the display device 100.

In addition, the display device 100 may include components such as a tuner (not illustrated) for receiving a broadcasting video from the outside, and a microphone (not illustrated) for receiving a user speech.

The processor 140 (or processor) may control the overall operation of the display device 100 using various programs stored in the memory 230.

The processor 140 may include the RAM 141, the ROM 142, a graphic processor 143, a main central processing unit (CPU) 144, first to n-th interfaces 145-1 to 145-n, and a bus 146. Here, the RAM 141, the ROM 142, the graphic processor 143, the main CPU 144, and the first to n-th interfaces 145-1 to 145-n may be connected to one another through the bus 146.

The RAM 141 stores an operating system (O/S) and an application program. Specifically, once the display device 100 is booted, the O/S may be stored in the RAM 141 and various application data selected by the user may be stored in the RAM 141.

The ROM 142 stores an instruction set for system booting, and the like. Once a turn-on command is input and power is supplied, the main CPU 144 copies the O/S stored in the memory 130 to the RAM 141 according to an instruction stored in the ROM 142, and executes the O/S to boot the system. Once the booting is completed, the main CPU 144 copies various application programs stored in the memory 130 to the RAM 141, and executes the application programs copied to the RAM 141 to perform various operations.

The graphic processor 143 generates a screen including various objects such as an item, an image, and a text by using a calculator (not illustrated) and a renderer (not illustrated). Here, the calculator may be a component that calculates an attribute value such as a coordinate value, a shape, a size, or a color in which each object is to be displayed according to a layout of the screen by using a control command received from the inputter 120. Further, the renderer may be a component that generates a screen with various layouts including an object based on the attribute value calculated by the calculator. The screen generated by the renderer may be displayed within a display region of the display 110.

The main CPU 144 accesses the memory 130 and performs the booting by using the O/S stored in the memory 130. Further, the main CPU 144 performs various operations by using various programs, contents, data, and the like stored in the memory 130.

The first to n-th interfaces 145-1 to 145-n are connected to various components described above. One of the first to n-th interfaces 145-1 to 145-n may be a network interface connected to an external device through the network.

Figure 3:
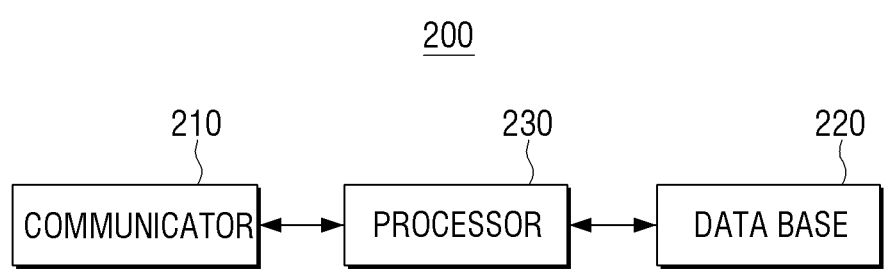
FIG. 3 is a block diagram illustrating a configuration of a server according to an embodiment of the disclosure.

FIG. 3 is a block diagram illustrating a configuration of the server 200 according to an embodiment of the disclosure. As illustrated in FIG. 3, the server 200 may include a communicator 210, a processor 230, and a database 220. Meanwhile, the configuration of the server 200 illustrated in FIG. 3 is only an example, and is not necessarily limited to that in the block diagram of FIG. 3. Therefore, a part of the configuration of the server 200 illustrated in FIG. 3 may be omitted, modified, or added depending on the type of the server 200 or a purpose of the server 200.

The communicator 210 may perform communication with the external display device 100 or the mobile device 300. Here, the communicator 210 may receive, from the display device 100 or the mobile device 300, information on the web page selected by the user. Further, the communicator 210 may transmit, to the display device 100 or the mobile device 300, the reconstructed content corresponding to the web page selected by the user.

The database 220 may store various programs and data for controlling the server 200. Specifically, the database 220 may store a program for generating the reconstructed content by using the web page. Further, the database 220 may store a reconstructed content corresponding to a web page selected by the user for each user account. For example, the database 220 may store a plurality of reconstructed contents corresponding to a plurality of web pages selected by a first user. Further, the database 220 may store user information. Here, the user information may include various information such as an age, a gender, a name, a preferred content, and search information of the user. Here, the database 220 may be implemented by various types of memories.

The processor 230 controls an overall operation of the server 200 by using the program stored in the database 220.

Particularly, in case that information (for example, domain information of a web page and metadata of a web page) on a web page selected by the user is received from the external mobile device 300 (or the display device 100), the processor 230 may obtain a reconstructed content corresponding to the web page based on the information on the web page selected by the user. Specifically, the processor 230 may determine the type of the web page based on the received information on the web page selected by the user. Here, the type of the web page may include an article web page, a video web page, an image web page, and the like, but is not limited thereto. A method in which the server 200 obtains the reconstructed content by using the processor 230 will be described later in detail.

Further, the processor 230 may provide a recommended content to the user based on the user information and the information on the web page selected by the user. Specifically, the processor 230 may provide a recommended content that is most suitable for the user based on the gender and age of the user, the domain information (for example, URL information) of the web page, and metadata (a title, a category, a hashtag, and the like).

Figure 4:
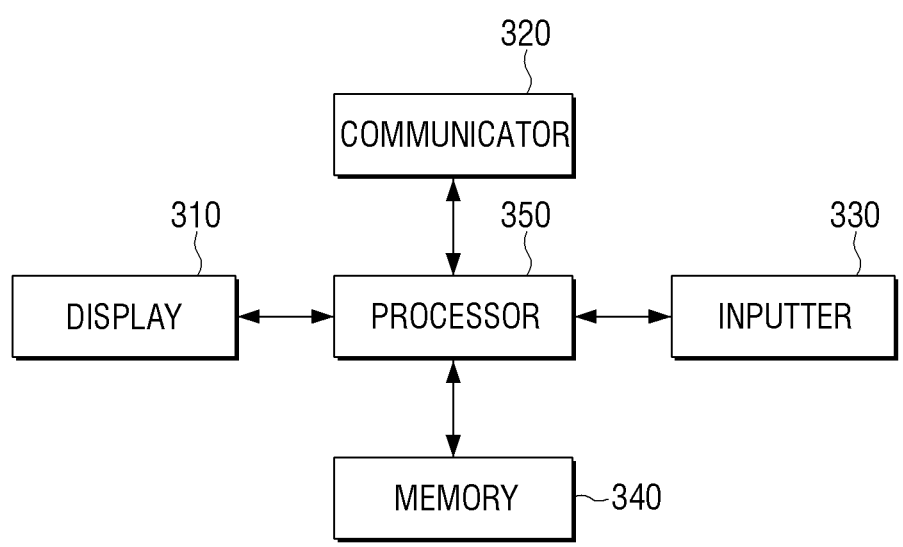
FIG. 4 is a block diagram illustrating a configuration of a mobile device according to an embodiment of the disclosure.

FIG. 4 is a block diagram illustrating a configuration of the mobile device according to an embodiment of the disclosure. As illustrated in FIG. 4, the mobile device 300 may include a display 310, a communicator 320, an inputter 330, a memory 340, and a processor 350. Meanwhile, the configuration of the mobile device 300 illustrated in FIG. 4 is only an example, and is not necessarily limited to that in the block diagram of FIG. 4. Therefore, a part of the configuration of the mobile device 300 illustrated in FIG. 4 may be omitted, modified, or added depending on the type of the mobile device 300 or a purpose of the mobile device 300.

The display 310 may display a web page. Here, the web page may include an article content, a video content, and an image content. Alternatively, the display 310 may display a web page list including a plurality of items corresponding a plurality of web pages.

The communicator 320 may perform communication with an external device and a server. Particularly, the communicator 320 may transmit, to the external server 200, the information on the web page selected by the user. Further, in case that the display device 100 directly generates the reconstructed content corresponding to the web page, the communicator 320 may transmit, to the display device 100, the information on the web page selected by the user. Here, the communicator 320 may be implemented by various communication modules such as a Wi-Fi chip, a Bluetooth chip, a wireless communication chip, and an NFC chip.

The inputter 330 may receive a user input for controlling the mobile device 300. Specifically, the inputter 330 may receive various user commands such as a user command for bookmarking a web page and a user command that selects one of the plurality of items included in the list. Here, the inputter 330 may be implemented by a touch panel for sensing a touch input of the user, but this is only an example. The inputter 330 may be implemented by various input devices such as a button, a mouse, a keyboard, and a microphone.

The memory 340 may store various programs and data for controlling the mobile device 300. Further, the memory 340 may store the information on the web page selected by the user. Further, the memory 340 may be store an application that provides a reconstructed content for a web page in association with the server 200 and the display device 100. Here, the memory may be implemented by various types of memories such as a volatile memory and a non-volatile memory.

The processor 350 may control an overall operation of the mobile device 300 using various programs stored in the memory 340. Particularly, in case that the user command that bookmarks a web page or the user command that selects one item from the list including the plurality of items corresponding to the plurality of web pages is input, the processor 350 may control the communicator 320 to transmit, to the server 200, information on the web page to be bookmarked, or the web page selected by the user. A detailed embodiment thereof will be described later in detail with reference to FIGS. 5a to 9c.

Hereinafter, various embodiments of the disclosure will be described with reference to FIGS. 5a to 27.

The mobile device 300 may receive a user input for bookmarking a web page or a user input for selecting one item from a list including a plurality of items corresponding to a plurality of web pages.

Figure 5A:
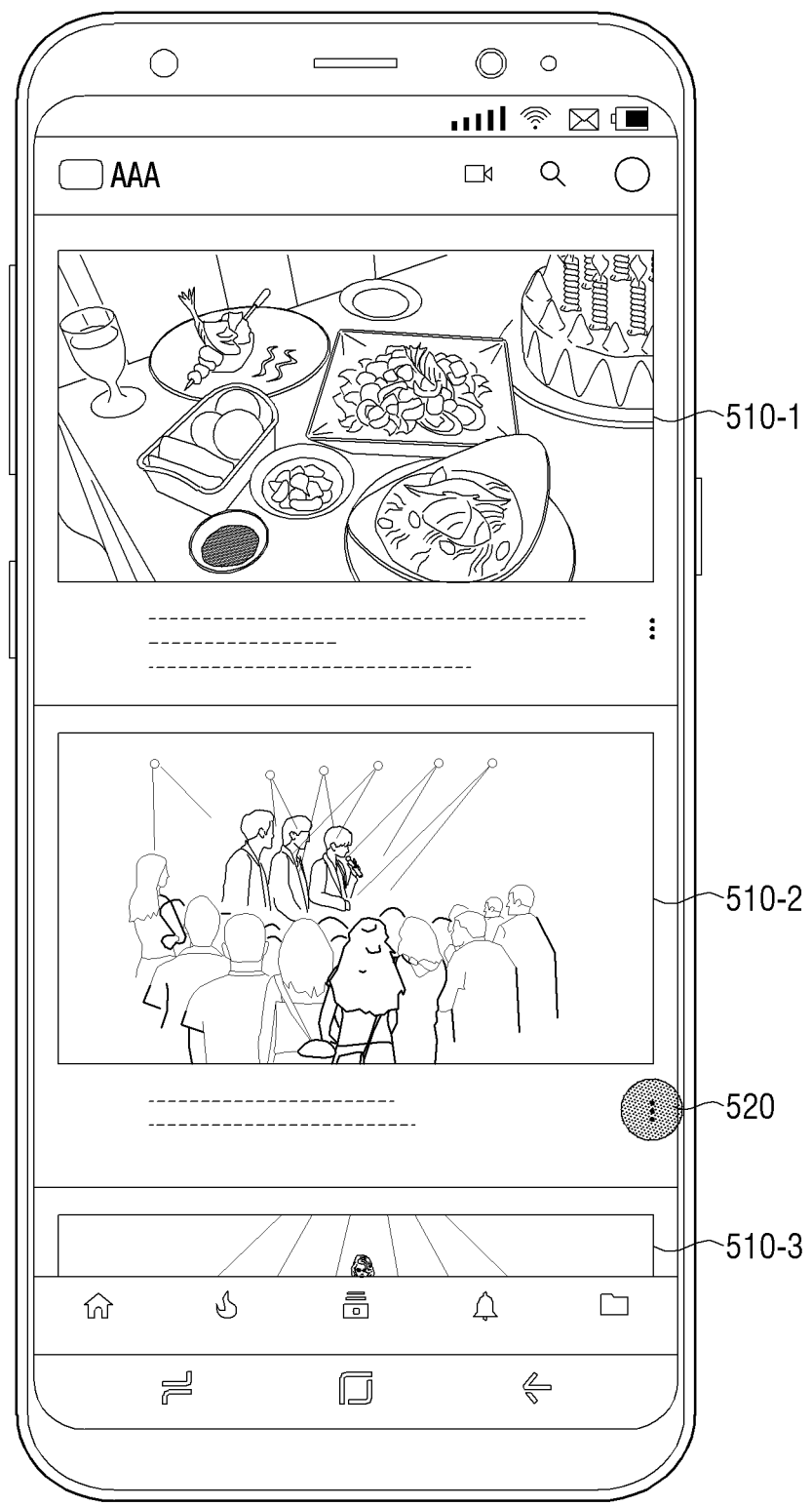
FIGS. 5a to 9c are views for describing examples in which a user selects a web page by using the mobile device according to various embodiments of the disclosure.

According to an embodiment of the disclosure, the mobile device 300 may display a list including a plurality of items 510-1 to 510-3 corresponding to a plurality of web pages as illustrated in FIG. 5a. For example, a first web page may correspond to a first item 510-1, a second web page may correspond to a second item 510-2, and a third web page may correspond to a third item 510-3.

Figure 5B:
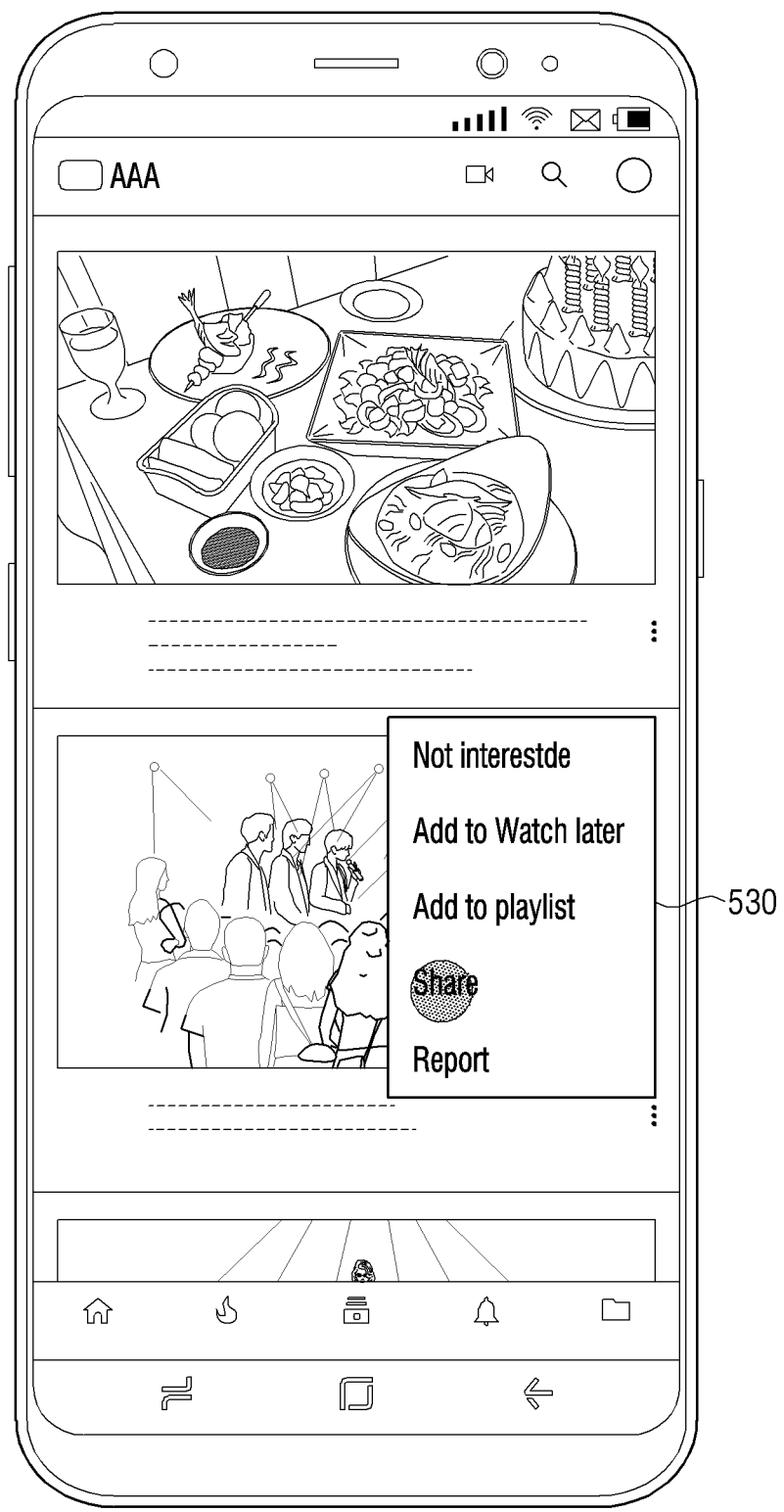

As illustrated in FIG. 5a, in case that a user command that selects an icon 520 displayed in the second item 510-2 among the plurality of items is input, the mobile device 300 may display, around the icon 520, a list 530 including functions related to the second web page corresponding to the second item 510-2 as illustrated in FIG. 5b. Here, the list 530 may include various items such as "Not interested", "Add to Watch later", "Add to playlist", "Share", and "Report".

Figure 5C:
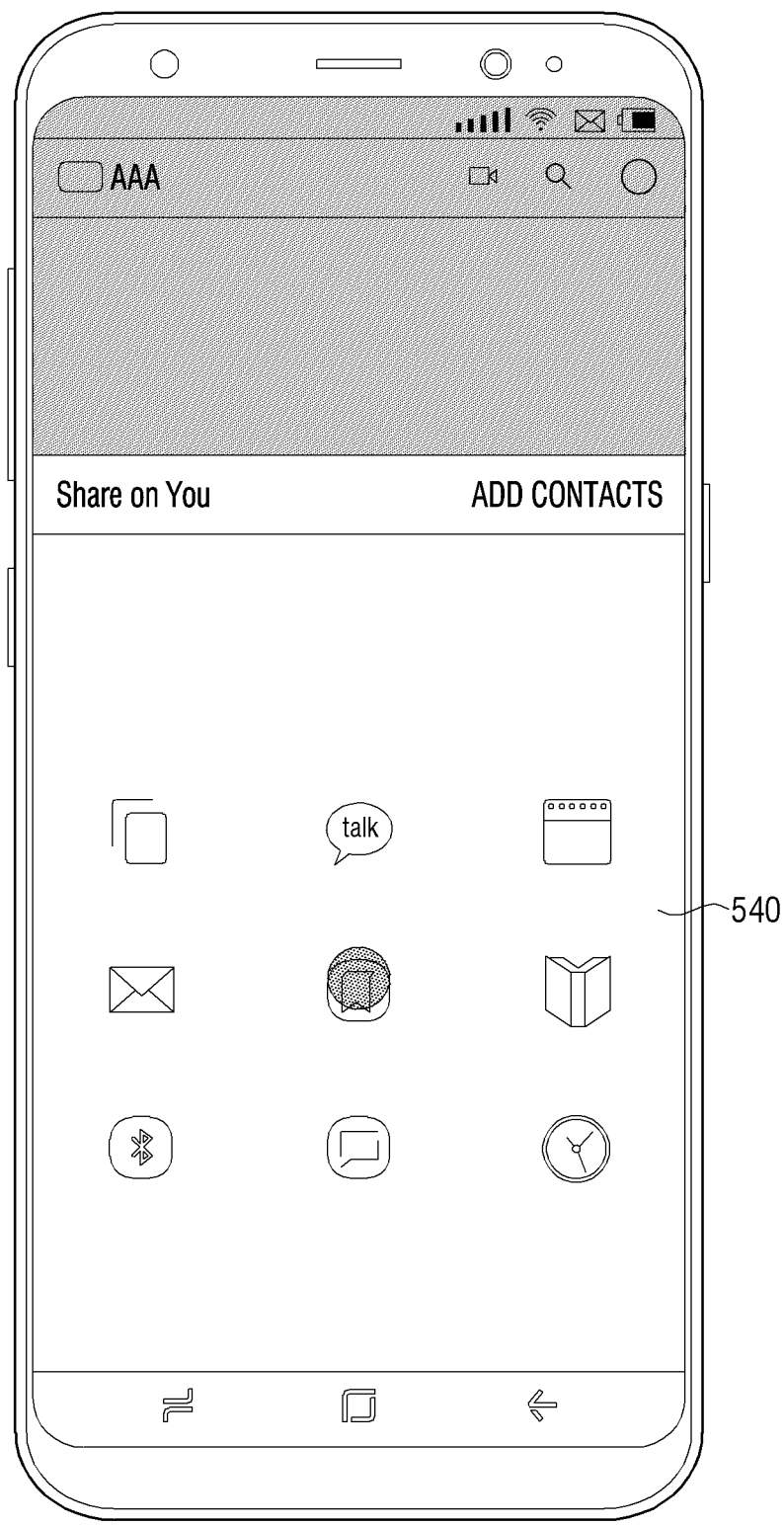
Figure 5D:
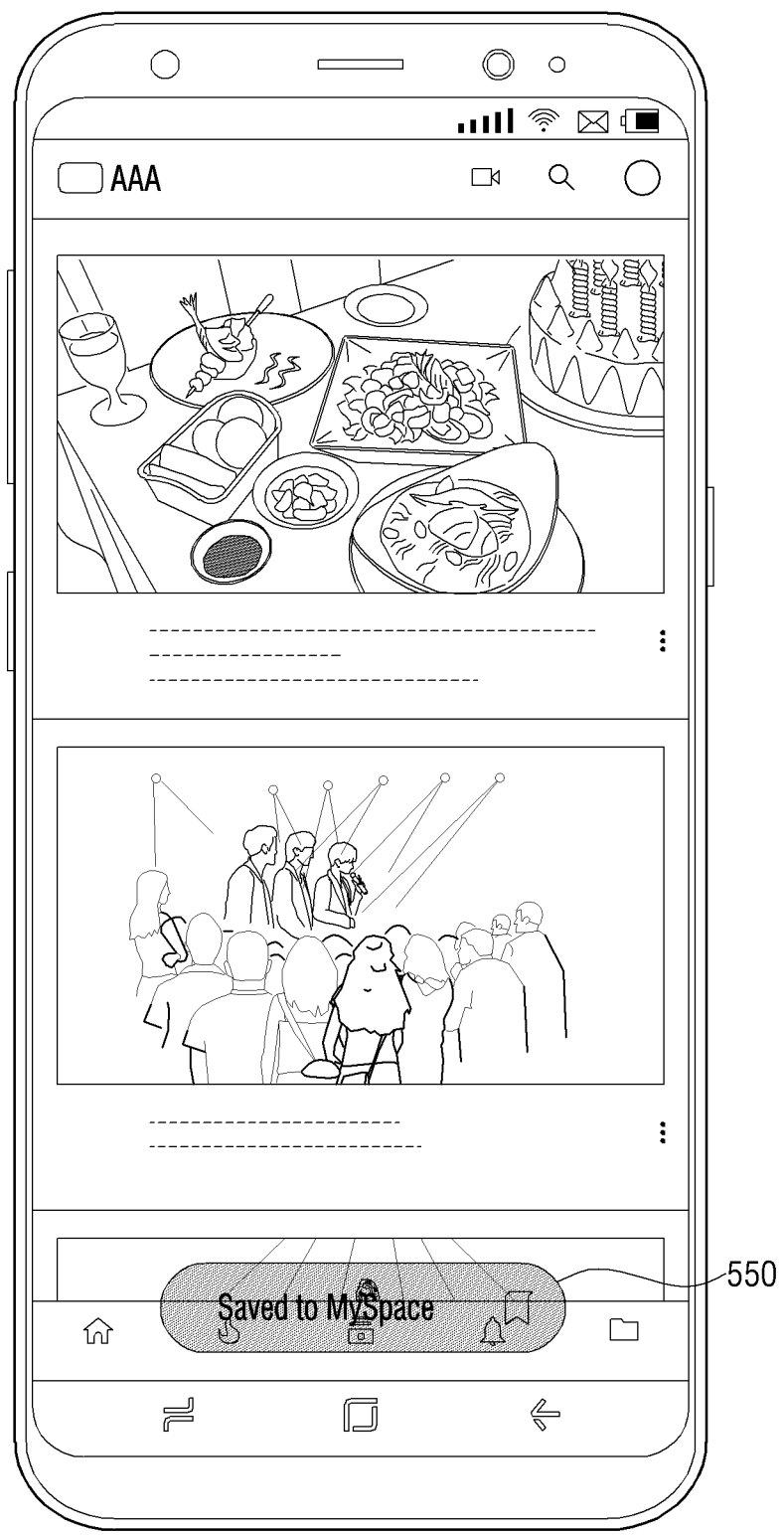

As illustrated in FIG. 5b, in case that "Share" is selected from the list 530, the mobile device 300 may display a list 540 including a plurality of applications with which the second web page may be shared as illustrated in FIG. 5c. As illustrated in FIG. 5c, in case that an application for providing a reconstructed content corresponding to a web page among the plurality of icons is selected, the mobile device 300 may transmit information on the second web page to the server 200 that corresponds to the application for providing a reconstructed content corresponding to a web page. Further, the mobile device 300 may display, on the list, a message 550 indicating that the information on the second web page is stored in the server 200 as illustrated in FIG. 5d.

Figure 6A:
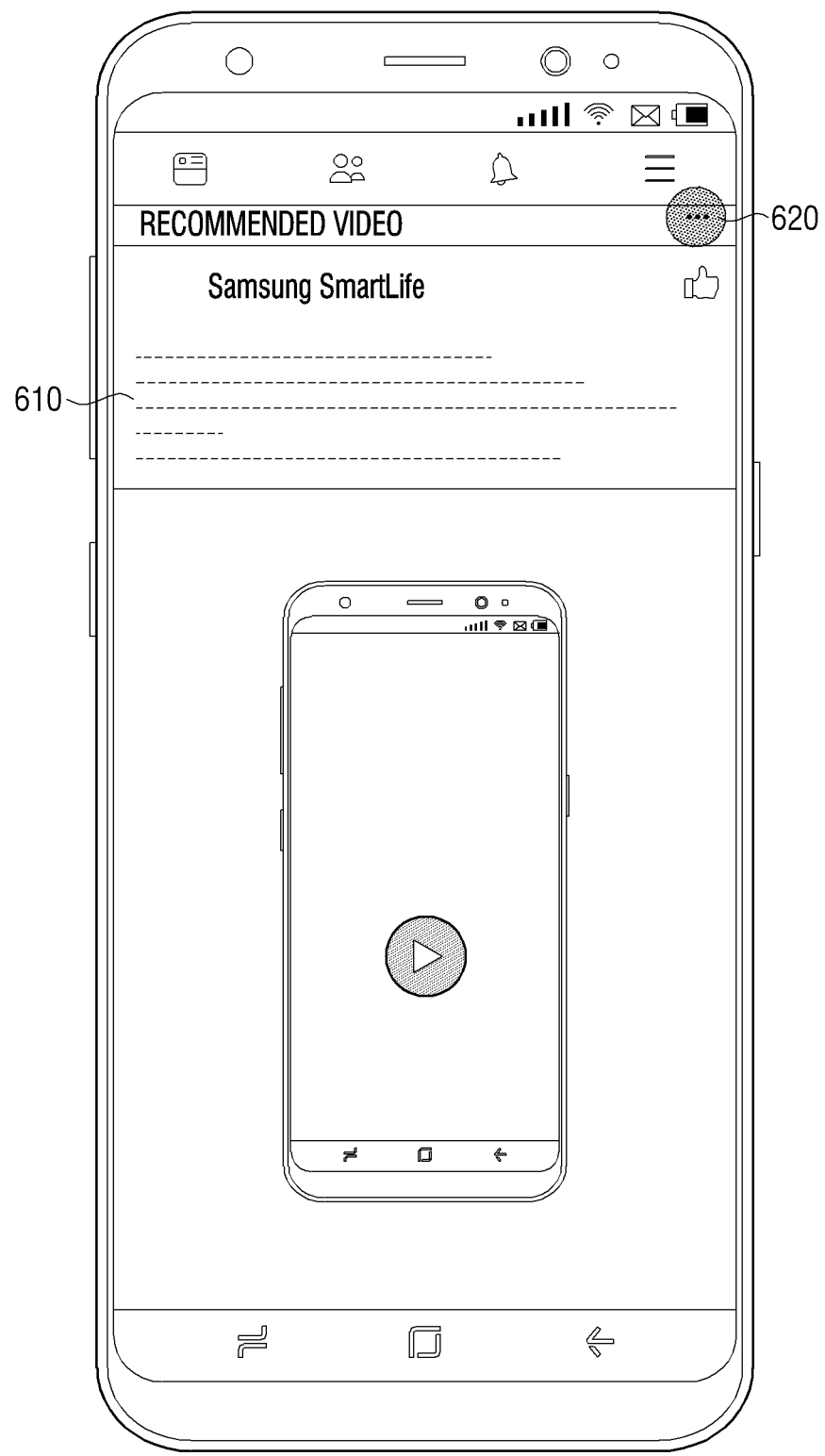

According to another embodiment of the disclosure, the mobile device 300 may display a web page 610 including a text element and a video element as illustrated in FIG. 6a. The mobile device 300 may receive a user input that selects an icon 620 included in the web page 610. Here, the icon 620 may be an icon for displaying a list including functions related to the web page 610.

Figure 6B:
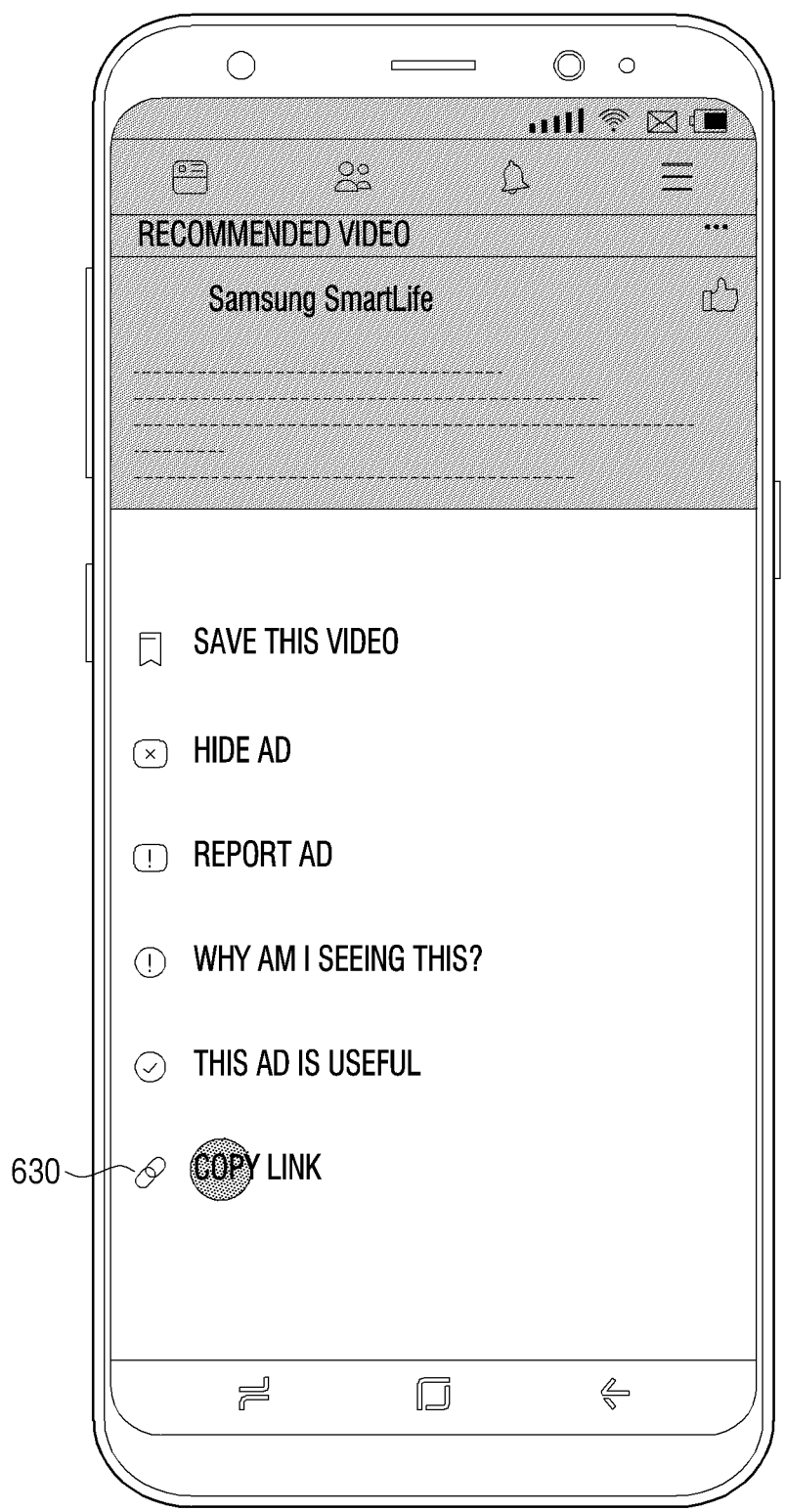

In case that the user input that selects the icon 620 is received, the mobile device 300 may display, on the web page 610, a list 630 including functions related to the web page 610 as illustrated in FIG. 6b. Here, the list may include various items such as "Save this video", "Hide ad", "Report ad", and "Copy link".

Figure 6C:
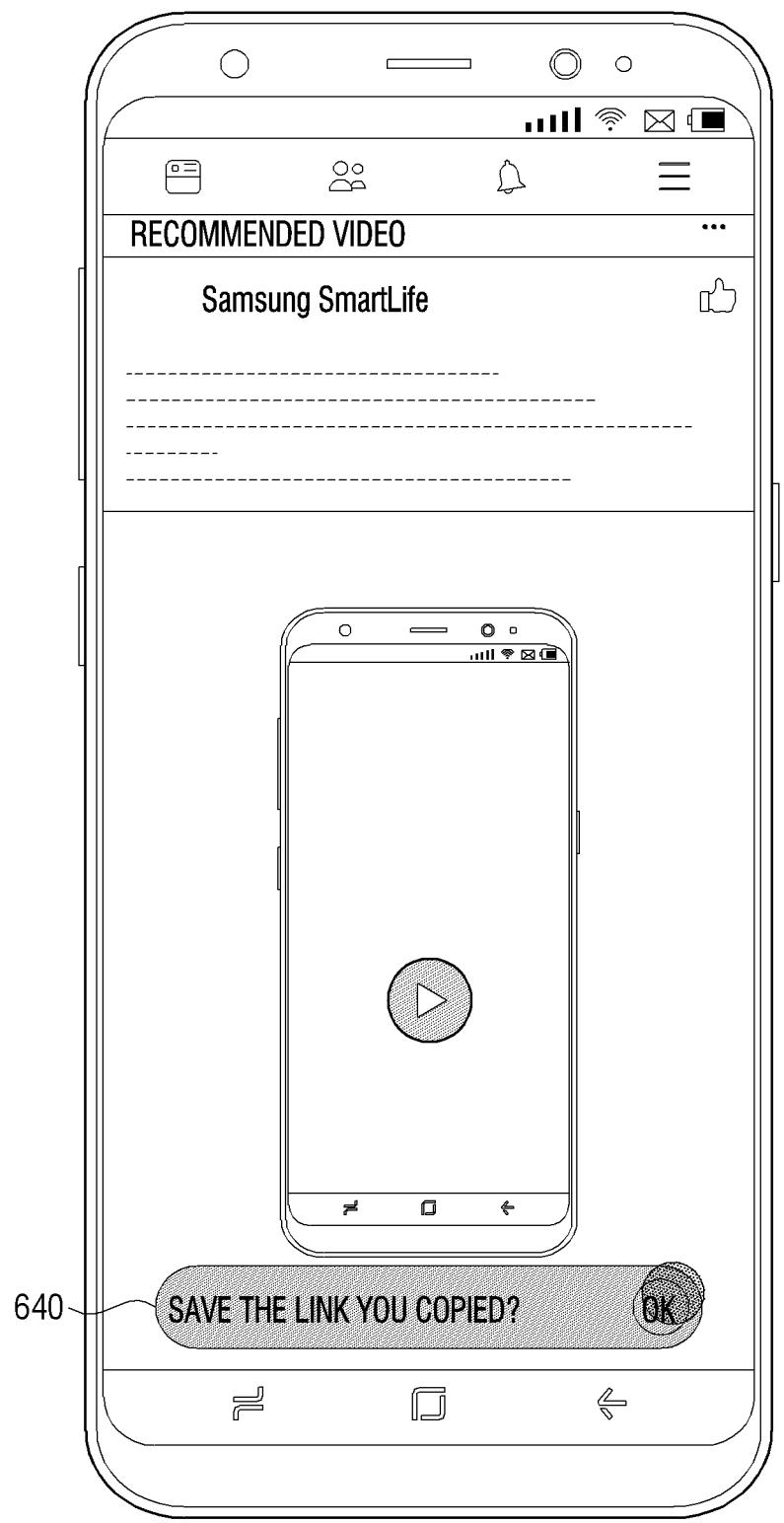
Figure 6D:
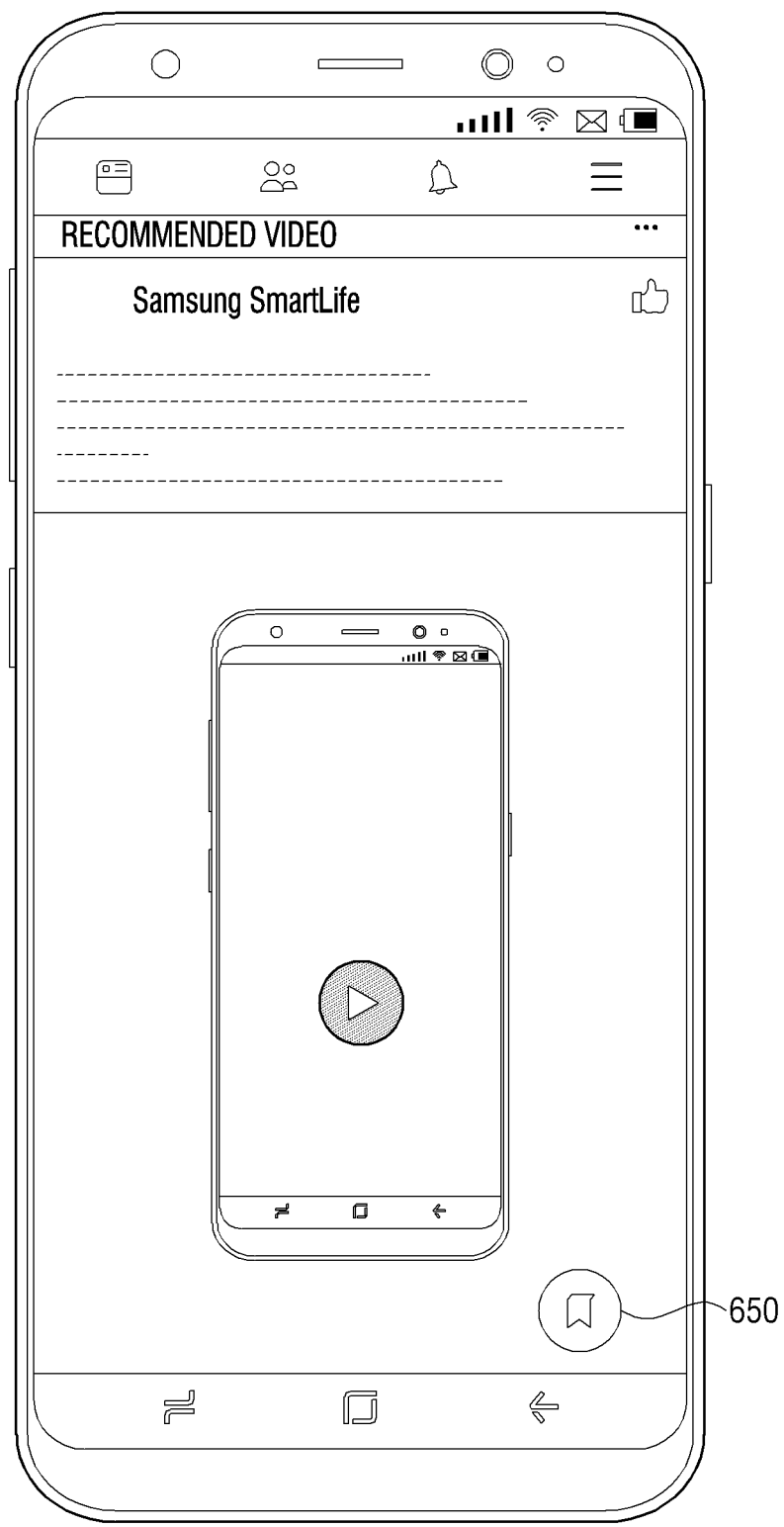

As illustrated in FIG. 6b, in case that a user command that selects the item "Copy link" is input, the mobile device 300 may display, on a lower side of a screen of the web page 610, a message 640 that asks whether or not to store a link of the web page as illustrated in FIG. 6c. Here, in case that a user input that selects an OK button included in the message 640 is sensed, the mobile device 300 may transmit information on the selected web page 610 to the external server 200, and may display an icon 650 indicating that the link of the web page 610 is stored in the server 200 as illustrated in FIG. 6d.

Meanwhile, the mobile device 300 may execute the application that provides a reconstructed content corresponding to a web page according to a user input. Here, once the application is executed, the mobile device 300 may manage a web page selected by the user according to a user input received through an application execution screen.

Figure 7A:
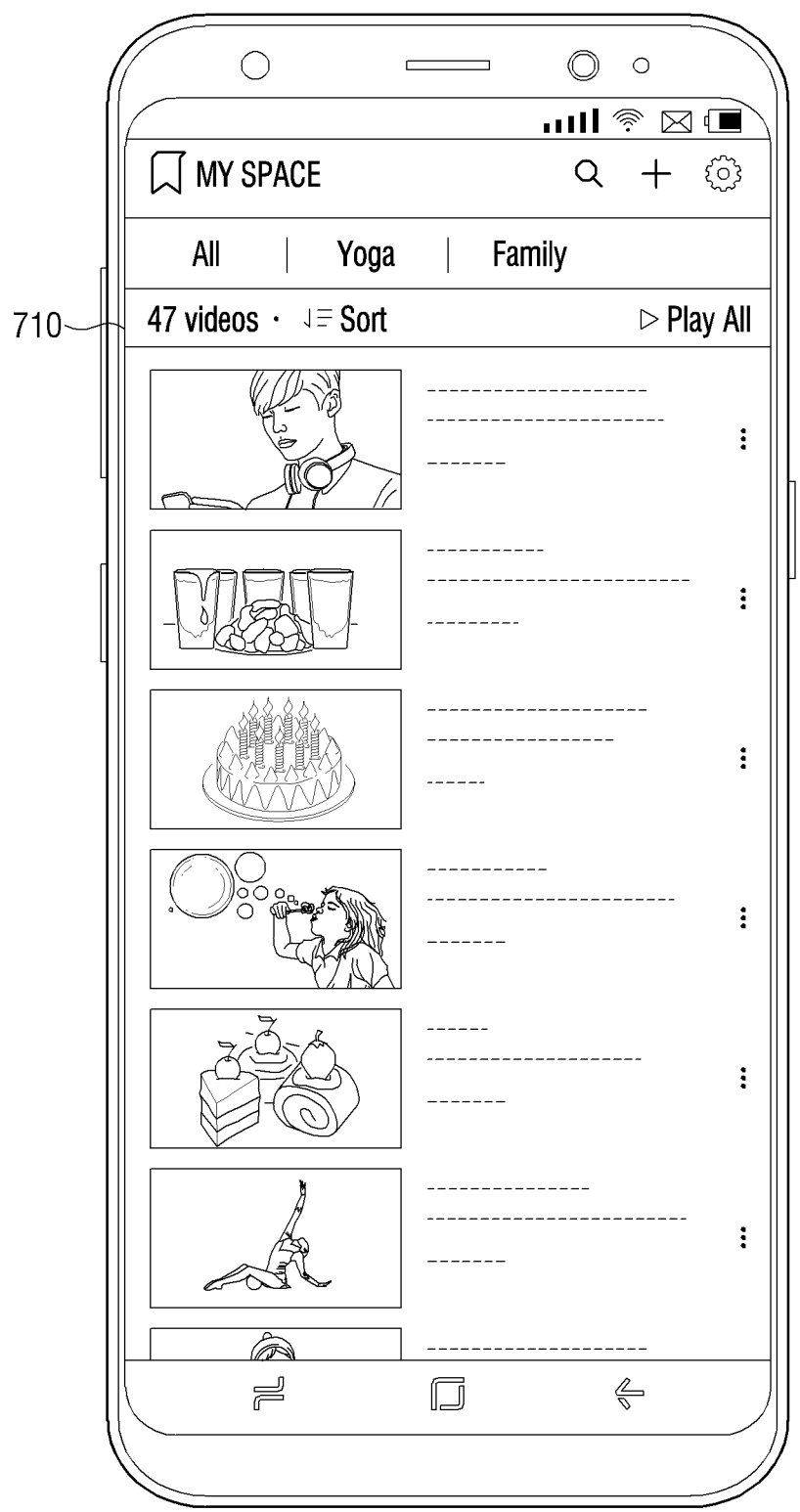

Specifically, once a user command for executing the application that provides a reconstructed content corresponding to a web page is input, the mobile device 300 may display a list 710 including a plurality of items corresponding to a plurality of web pages selected by the user as illustrated in FIG. 7a. Here, the web pages included in the list 710 may be web pages which are shared by the user or of which links are copied as described with reference to FIGS. 5a to 6d, but the disclosure is not limited thereto.

Figure 7B:
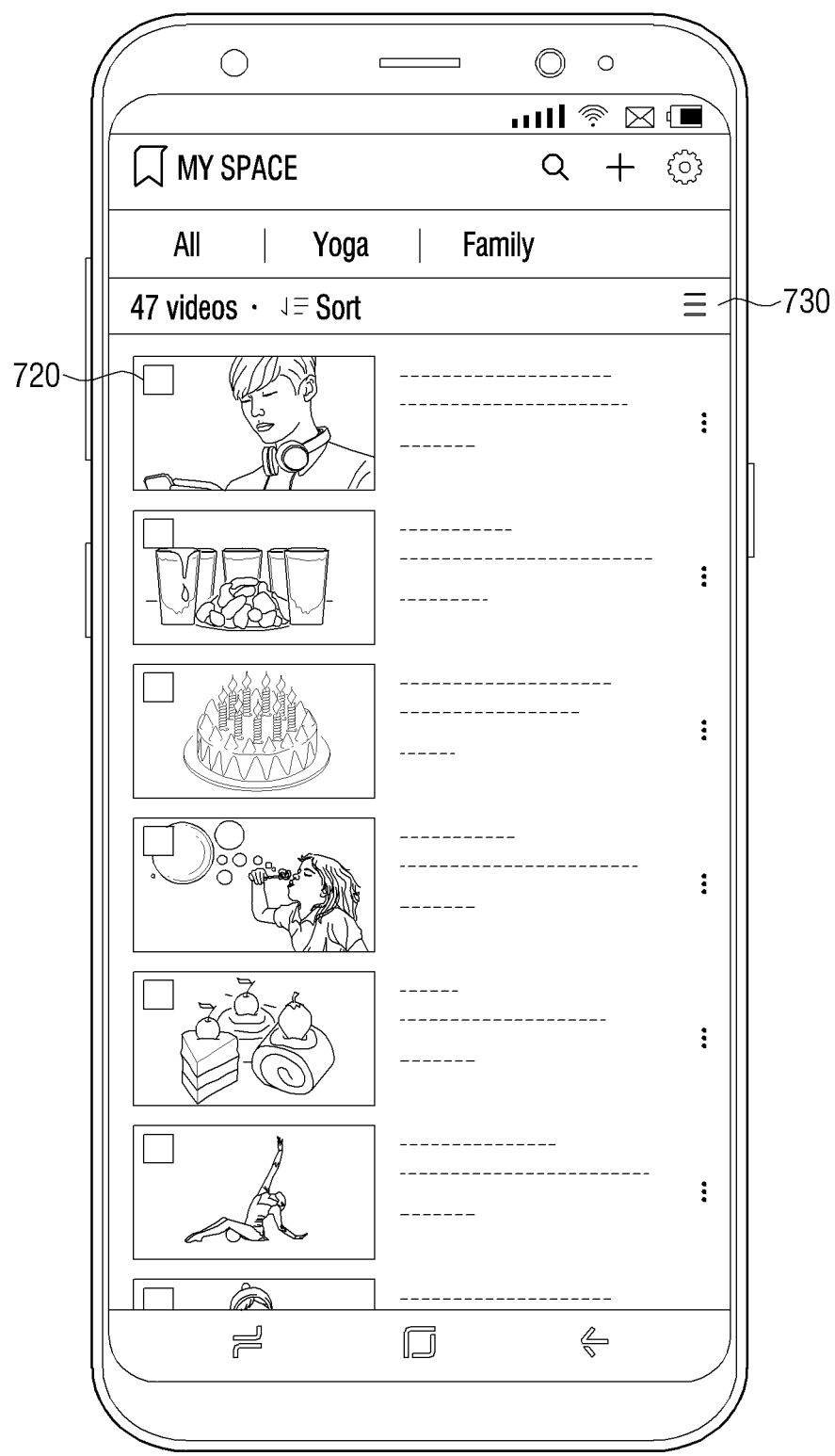

In case that a long-press input of touching any point of the list 710 for a predetermined time or more while the list 710 is displayed, the mobile device 300 may display checkboxes 720 on the items included in the list 710, respectively, as illustrated in FIG. 7b.

The mobile device 300 may receive a user input that selects at least one of the plurality of checkboxes 720. When a user input that selects at least one of the plurality of checkboxes 720 is received, the mobile device 300 may tick the checkbox selected by the user among the plurality of checkboxes 720.

Figure 7C:
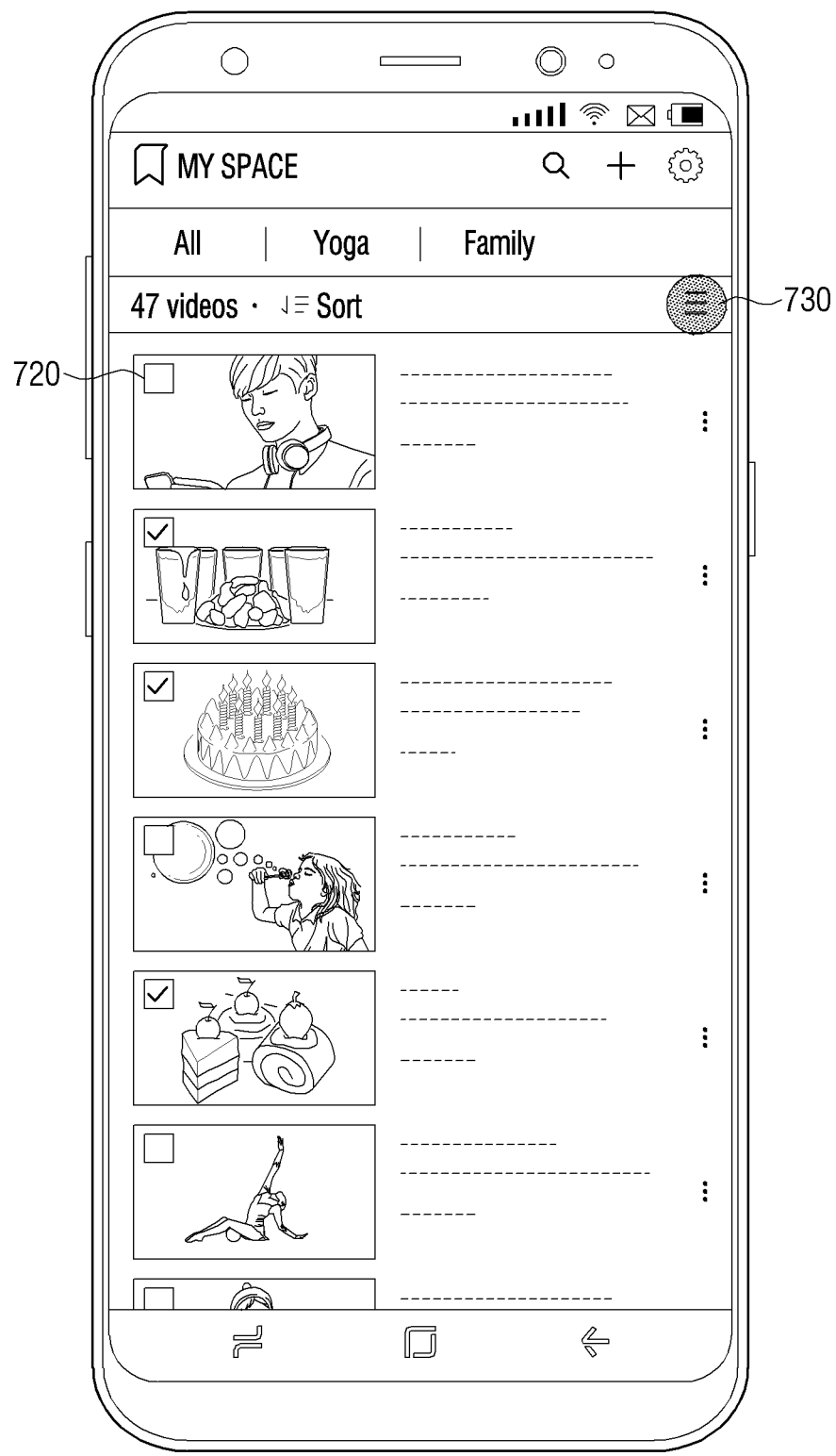

As illustrated in FIG. 7c, the mobile device 300 may receive a user input that selects an icon 730 displayed on the list 710. Here, the icon 730 may be an icon for deleting or adding selected items from an existing playlist or to a new playlist.

Figure 7D:
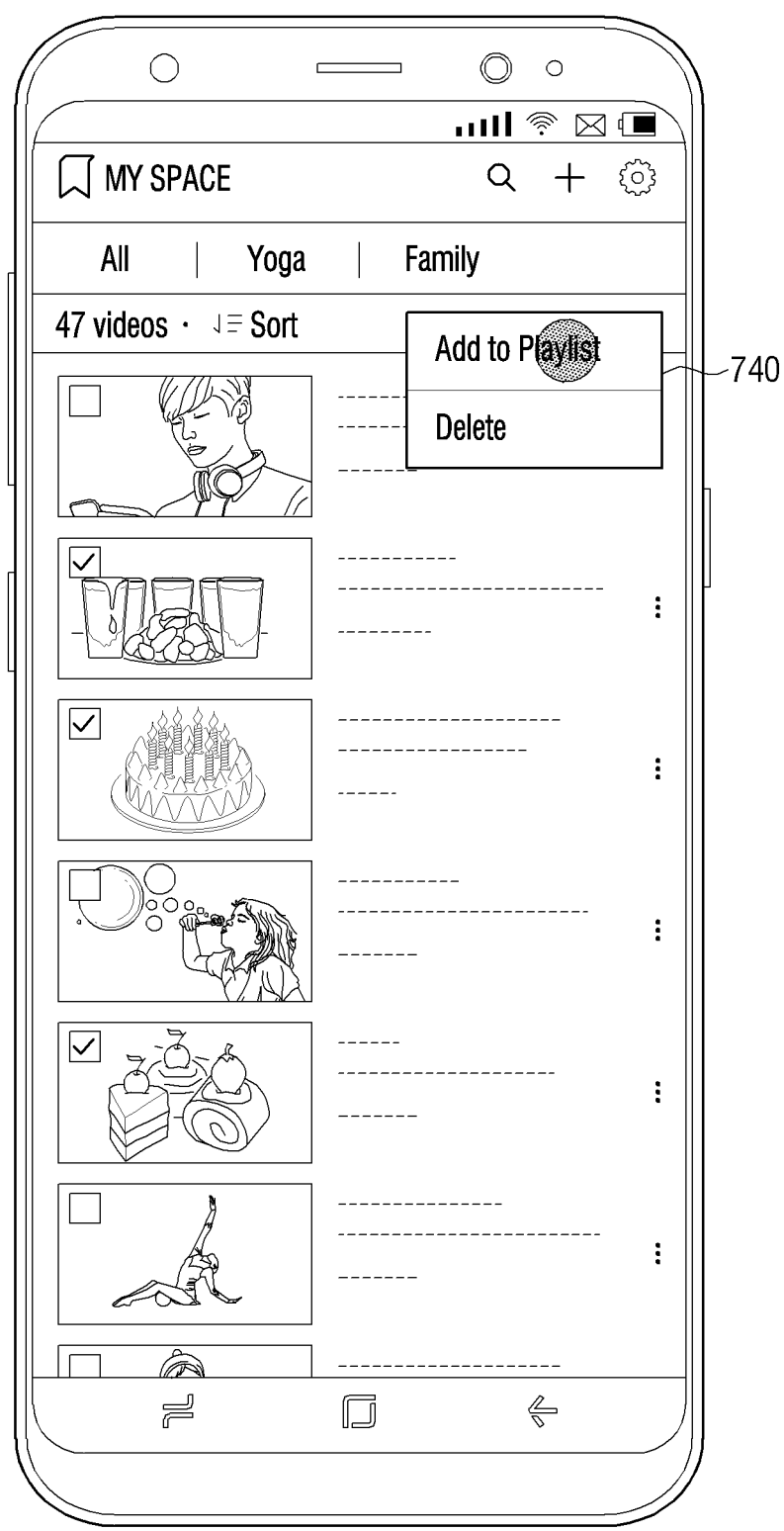

In case that the user input that selects the icon 730 is received, the mobile device 300 may display, on the list 710, a list 740 for adding or deleting a playlist as illustrated in FIG. 7d.

Figure 7E:
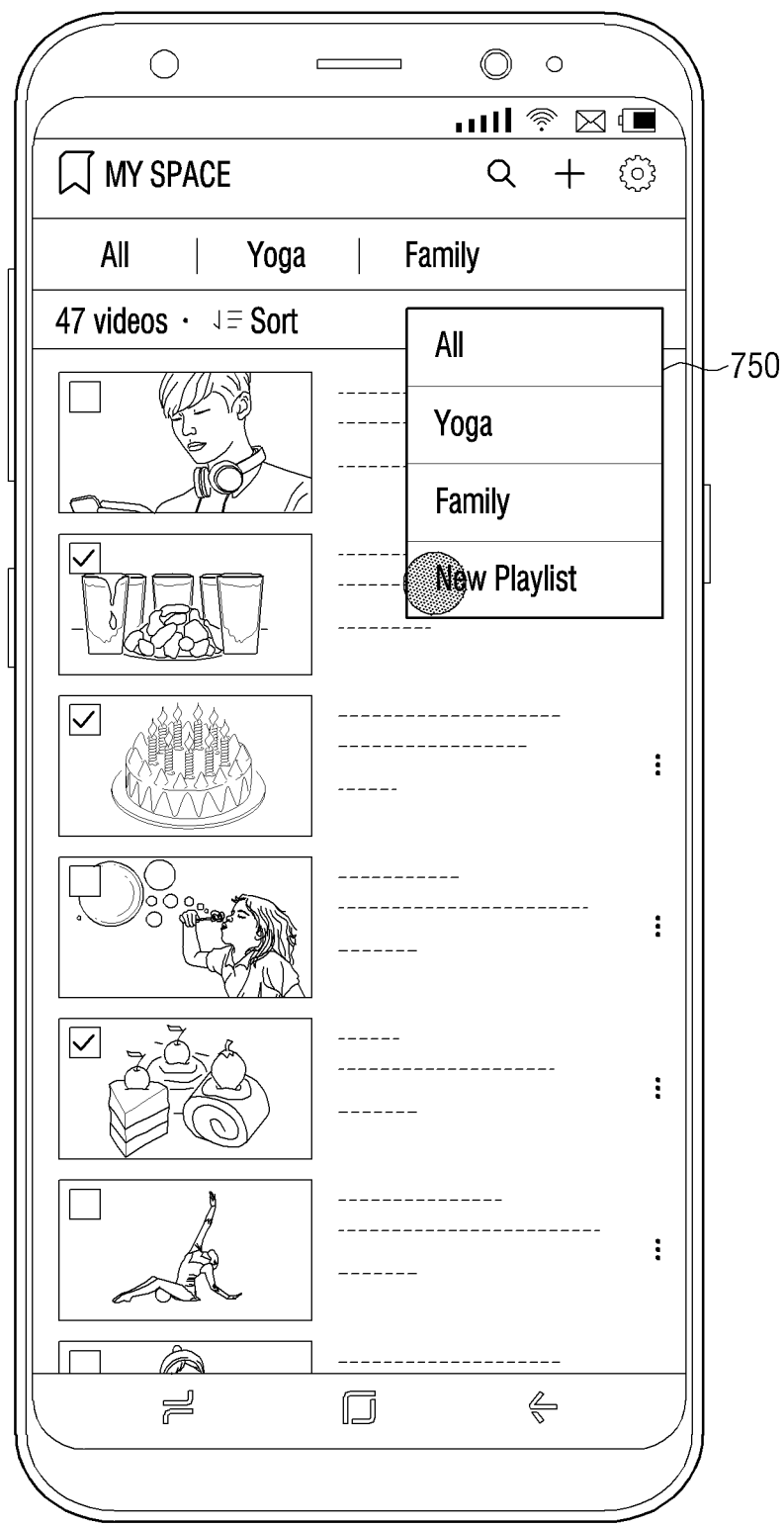

In case that a user input for "Add to Playlist" is received, the mobile device 300 may display a list 750 including a playlist to which selected items are to be added as illustrated in FIG. 7e.

Figure 7F:
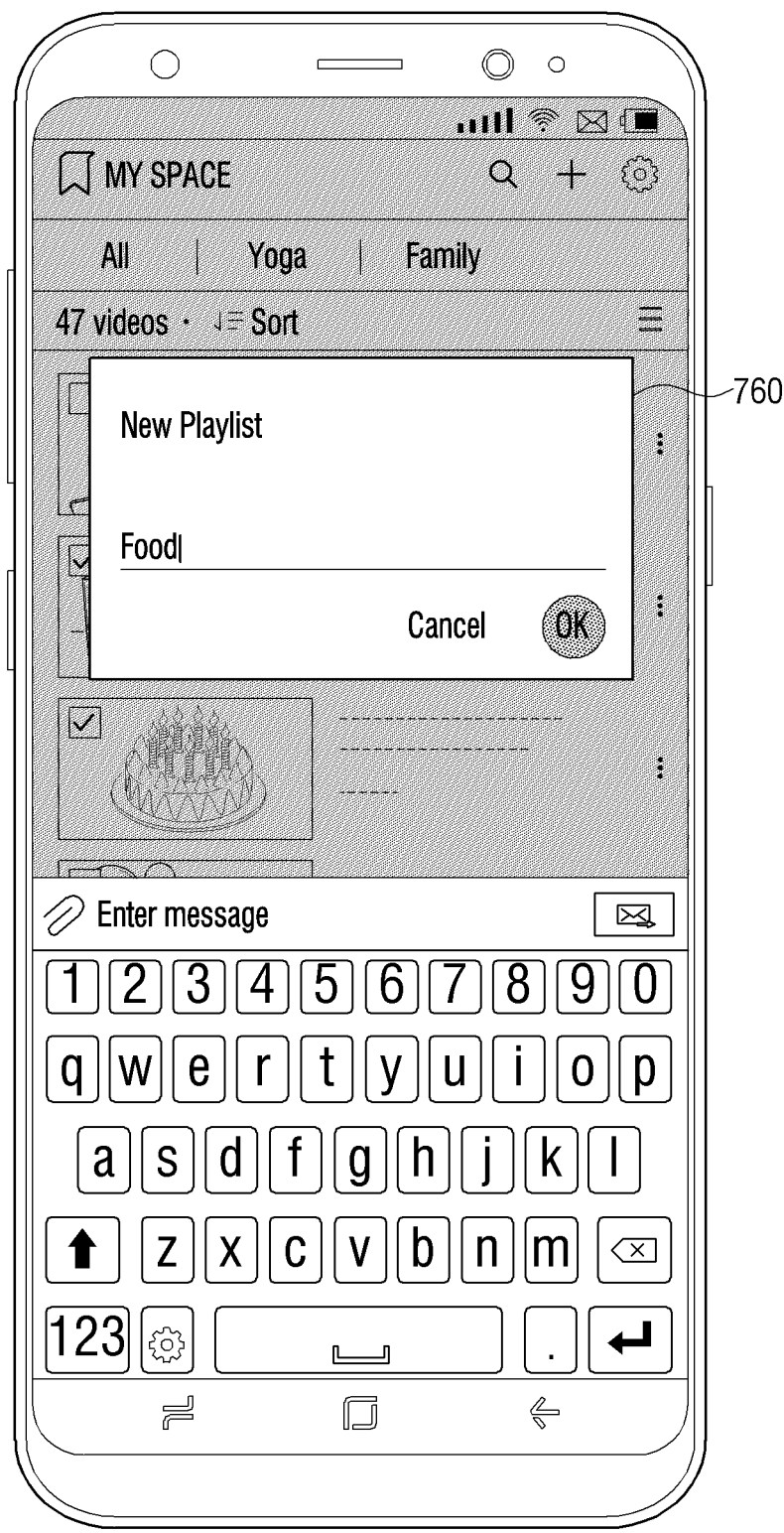

In case that a user input for adding a new playlist is received, the mobile device 300 may display a menu screen 760 for setting a name of the new playlist as illustrated in FIG. 7f. For example, the mobile device 300 may receive a user command for setting the name of the new playlist to "Food".

Figure 7G:
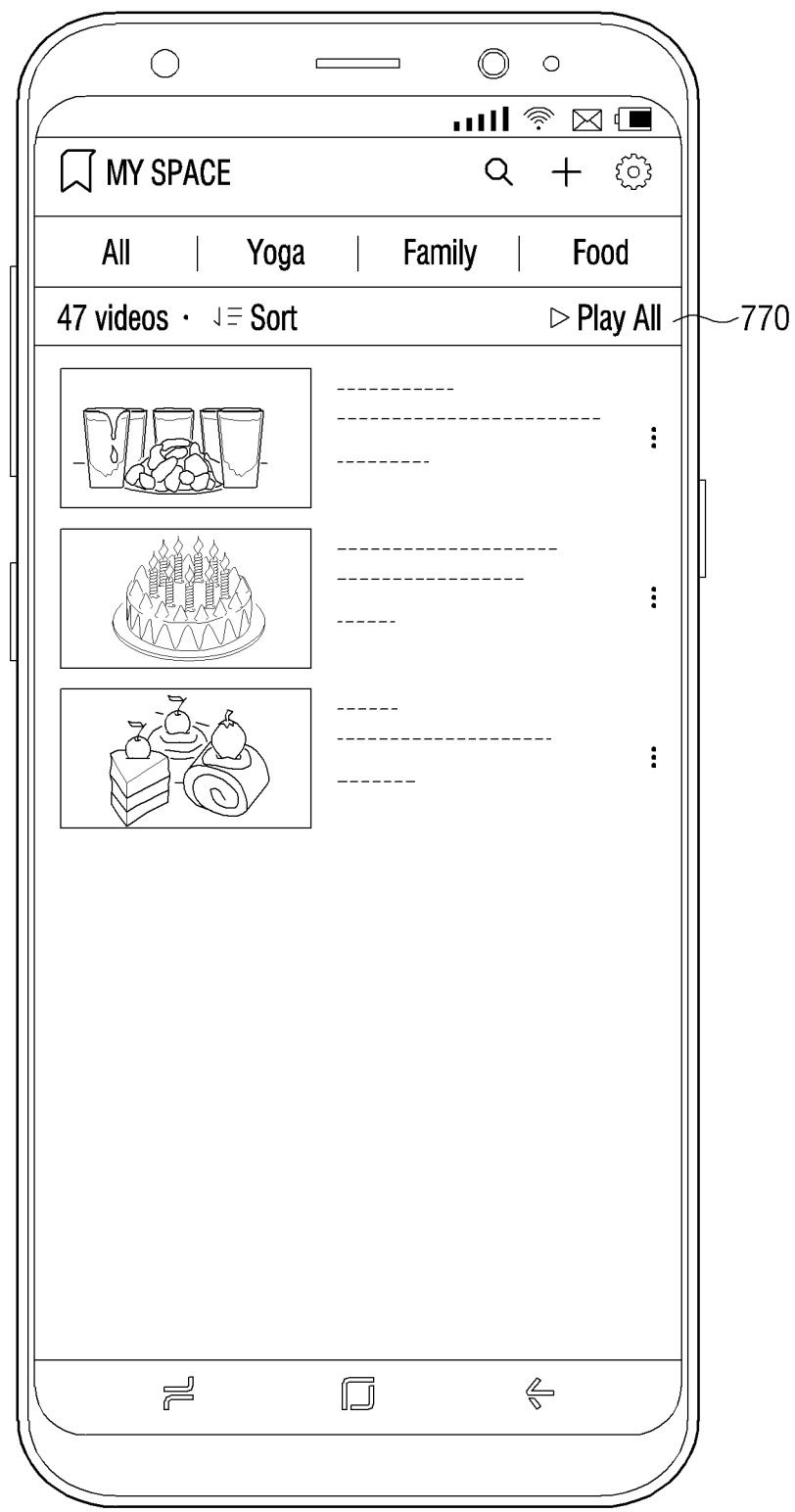

In case that the user input that sets a name of the new playlist is received through the menu screen 760, the mobile device 300 may create a tab (for example, a "Food" tab) corresponding to the new playlist, and add, to the new playlist, web pages corresponding to the items selected by the user as illustrated in FIG. 7g. Here, the mobile device 300 may transmit, to the external server 200, information on the new playlist.

Meanwhile, although the case that the user directly creates a playlist and adds a web page has been described in the embodiment described above, this is only an example and the mobile device 300 (or server 200) may directly create a playlist based on information (for example, metadata) on a web page. Specifically, the mobile device 300 may sort web pages into categories based on information on the web pages, and may determine a playlist to which a web page is to be added based on a category of the web page. For example, in case that information on a web page selected by the user includes a food recipe, the mobile device 300 may determine a category of the web page selected by the user as "Food", and add the web page selected by the user to a playlist (for example, "Food") corresponding to the determined category.

Further, the application that provides a reconstructed content corresponding to a web page may be connected to various applications for operation. For example, the application that provides a reconstructed content corresponding to a web page may be operated in association with applications that may provide various contents, such as Facebook™, Youtube™, and Instagram™.

Hereinafter, an operation for adding an application to be connected to the application that provides a reconstructed content corresponding to a web page will be described with reference to FIGS. 8a to 8e.

Figure 8A:
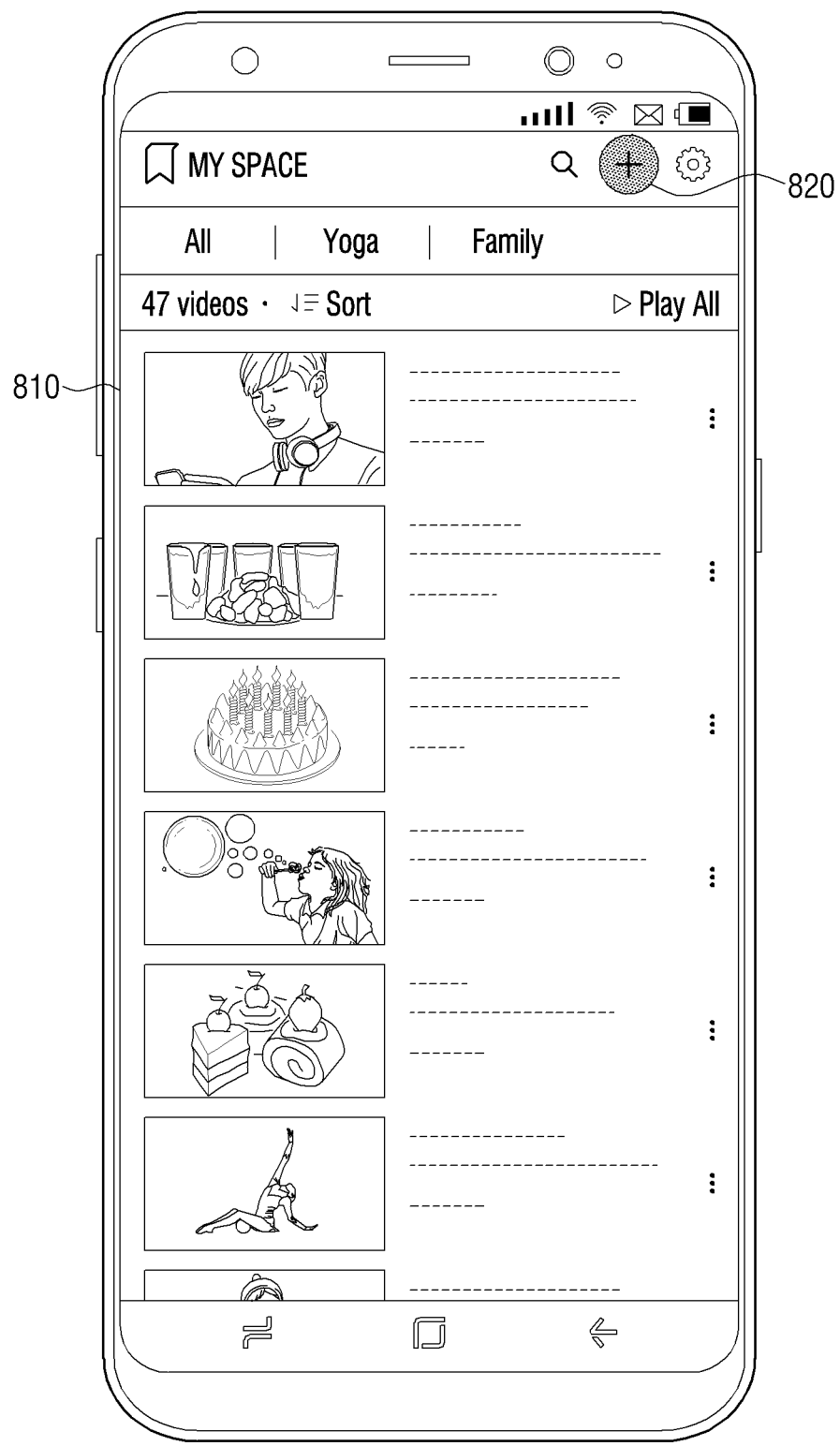

First, the mobile device 300 may display an execution screen of the application that provides a reconstructed content corresponding to a web page as illustrated in FIG. 8a. Here, a list 810 including a plurality of applications selected by the user and an icon 820 for displaying a library list may be displayed on the execution screen.

Figure 8B:
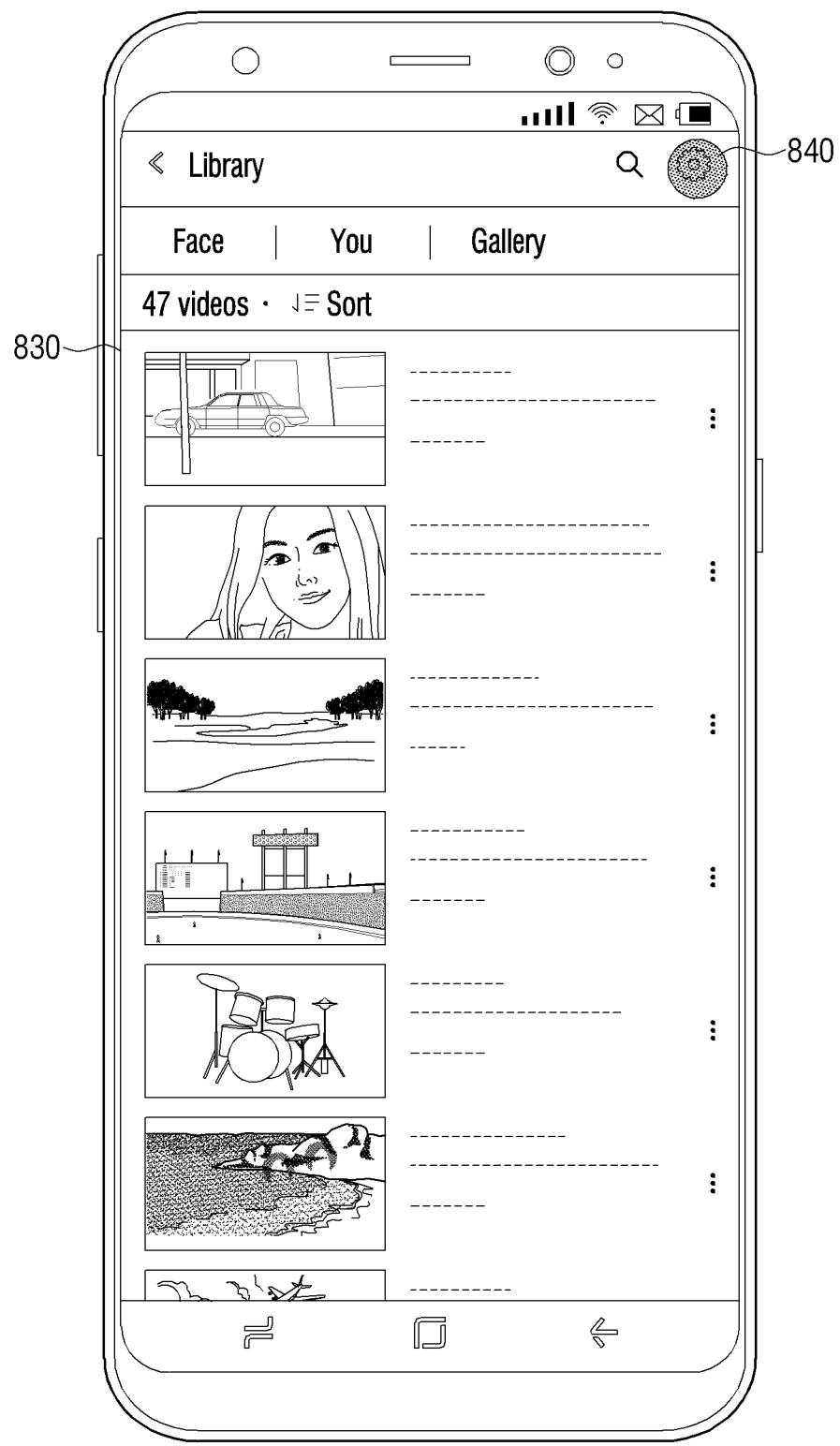

In case that a user input that selects the icon 820 is received, the mobile device 300 may display a library list 830 as illustrated in FIG. 8b. Here, the library list 830 may be a list in which web pages are provided while being divided by a type of an application connected to the application that provides a reconstructed content corresponding to a web page. For example, the library list 830 may provide web pages provided by a first connected application and web pages provided by a second connected application in a separate manner.

Figure 8C:
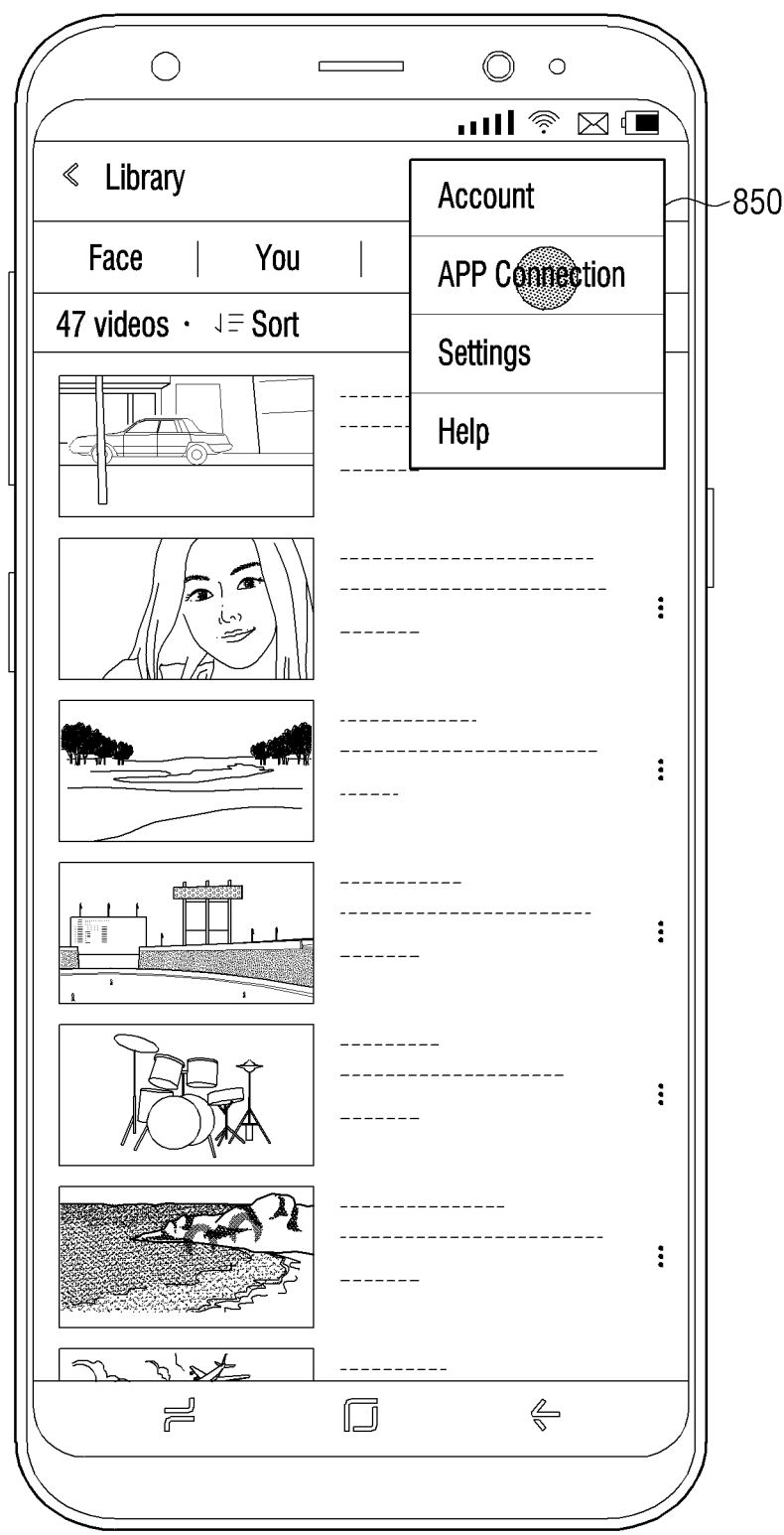
Figure 8D:
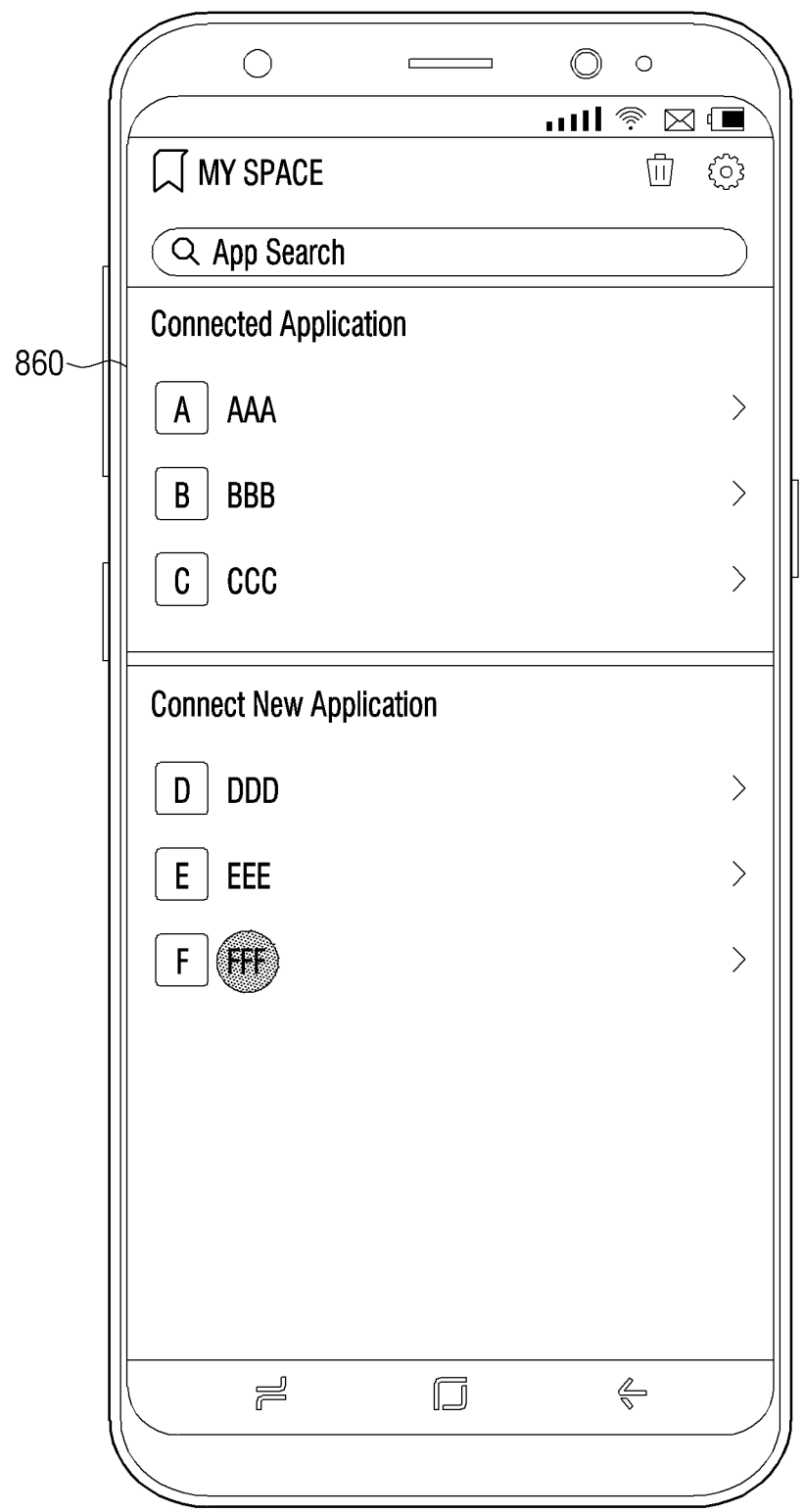

Here, in case that a user input that selects a setting icon 840 for the library list 830 is received, the mobile device 300 may display a list 850 including various functions related to the library list 830 as illustrated in FIG. 8c. Here, in the list 850, the list 850 such as "Account", "App connection", "Settings", and "Help" may be displayed.

In case that a user input that selects the item "APP connection" is received, the mobile device 300 may display a list 860 including currently connected applications and applications that may be newly added.

Figure 8E:
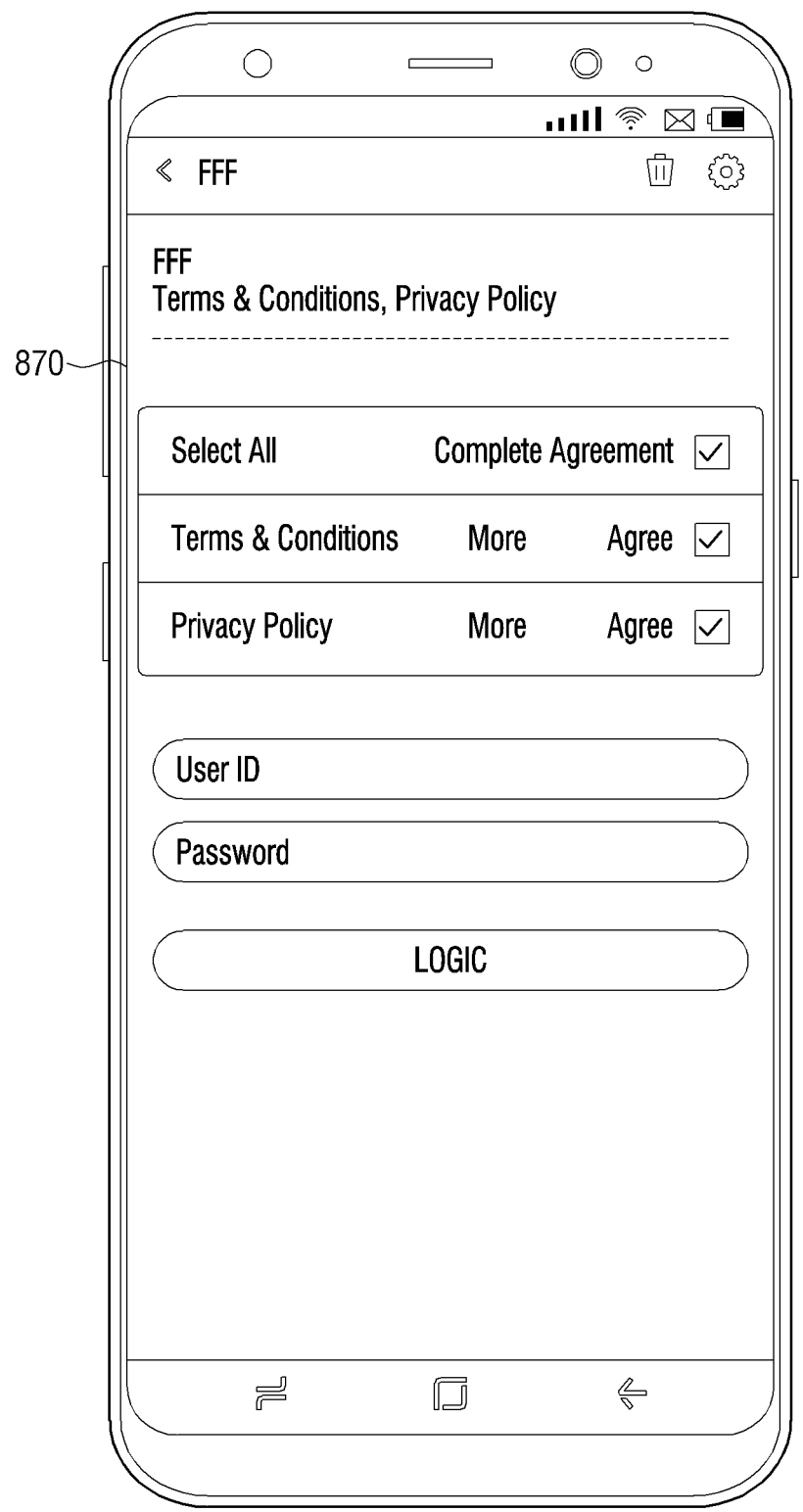

In case that one of the applications included in the list 860 is selected, the mobile device 300 may display a menu screen 870 for connection to the application selected by the user as illustrated in FIG. 8e. The mobile device 300 may add the application selected by the user as an application to be connected to the application that provides a reconstructed content corresponding to a web page according to a user input received through the menu screen 870.

Further, the mobile device 300 may manage web pages selected by the user according to received user inputs on the library list.

Figure 9A:
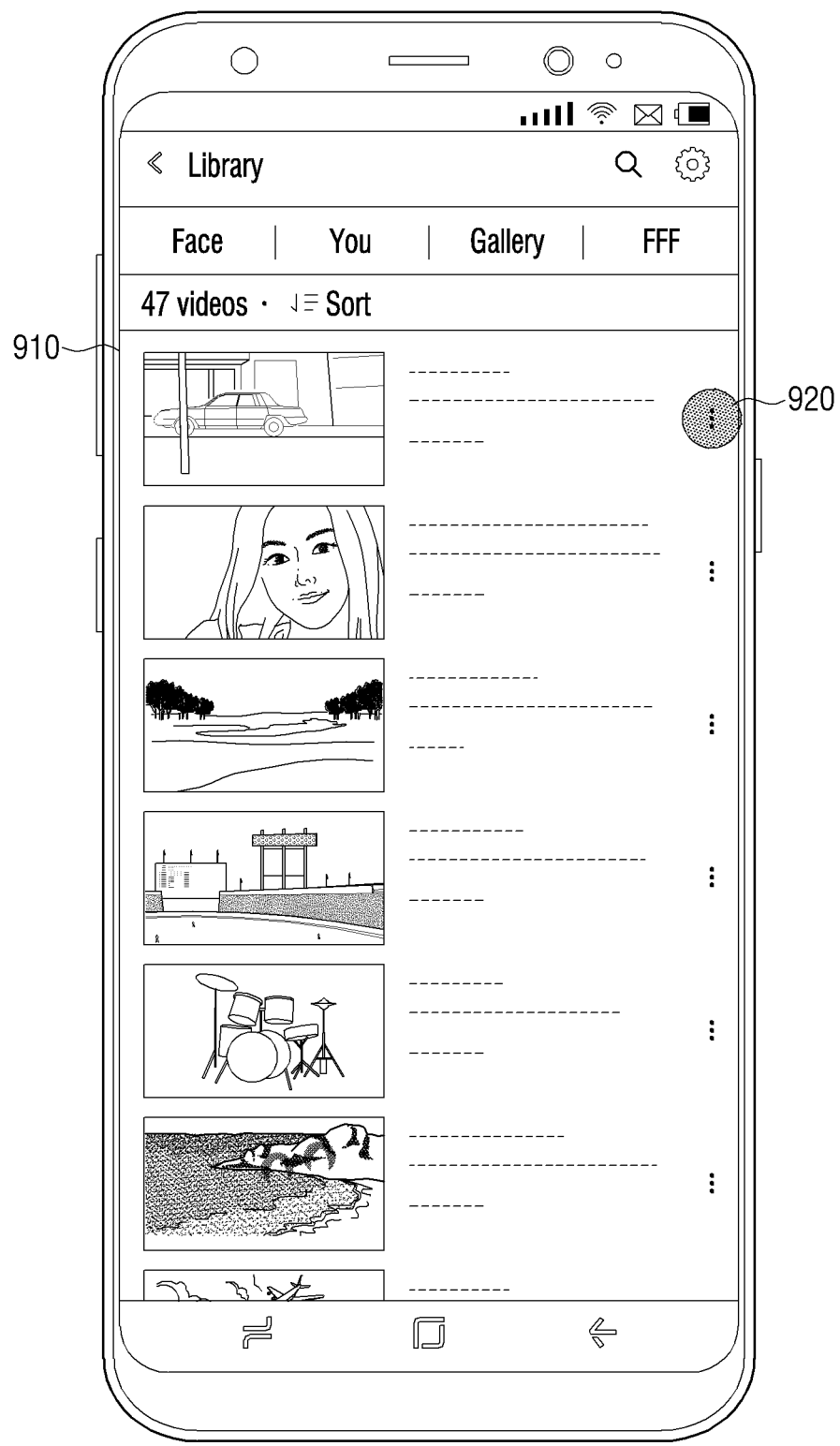
Figure 9B:
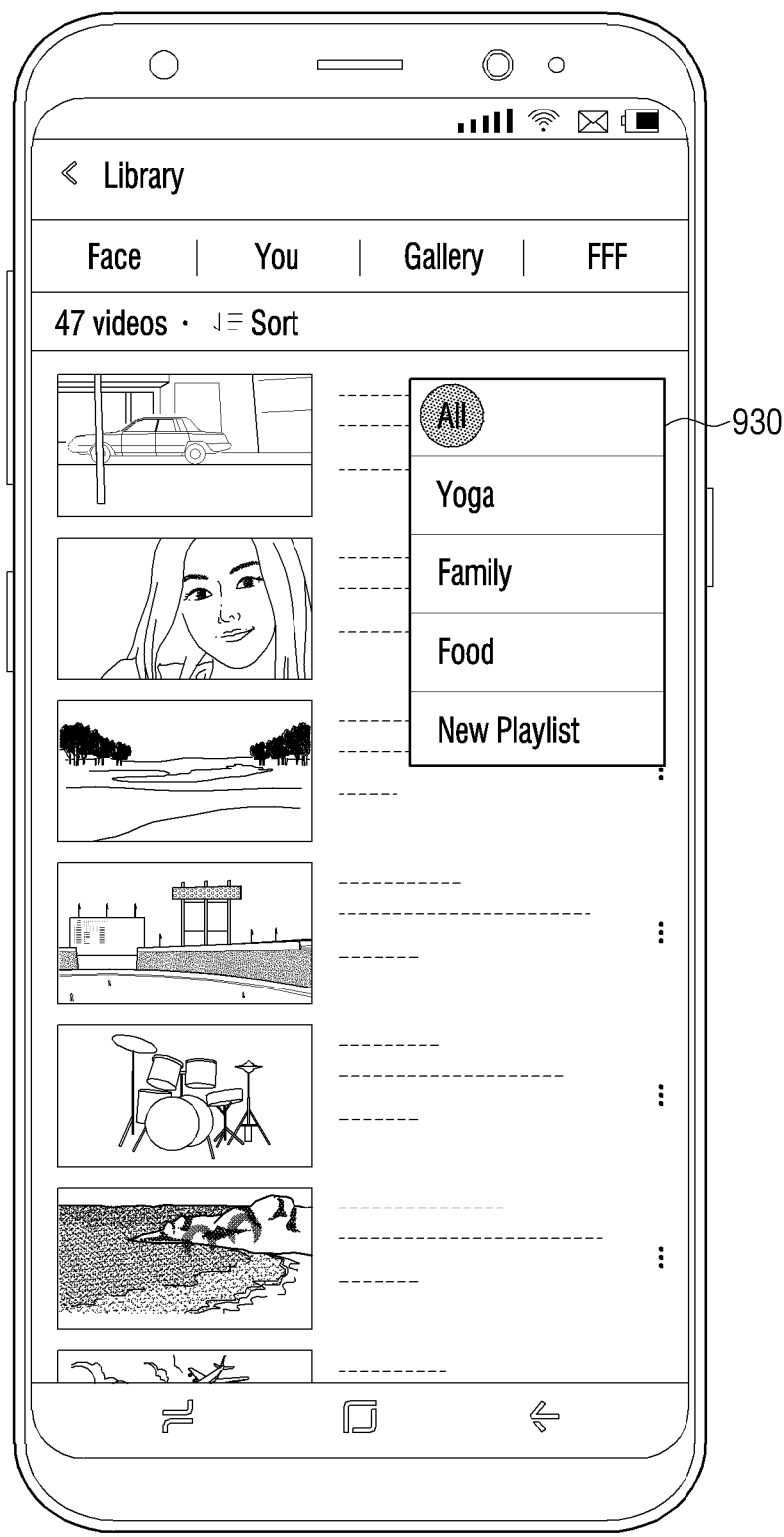

Specifically, the mobile device 300 may display a list 910 including a plurality of items corresponding to a plurality of web pages as illustrated in FIG. 9a. Here, in case that a user input that selects an icon 920 displayed on a first item is received, the mobile device 300 may display a list 930 for determining a playlist to which a web page corresponding to the first item is to be added as illustrated in FIG. 9b.

Figure 9C:
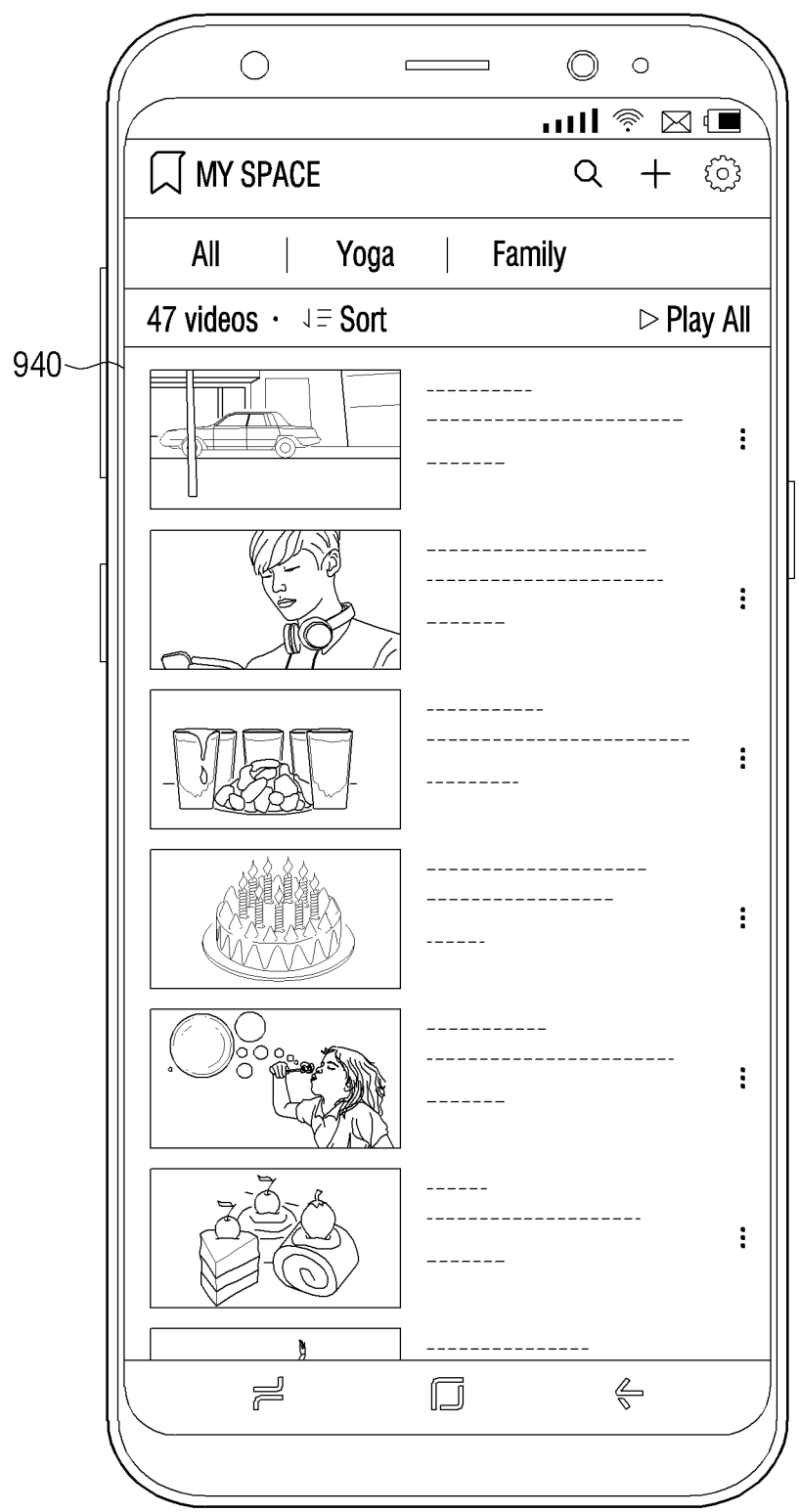

In case that a user input that selects one of playlists displayed in the list 930 is received, the mobile device 300 may add the web page corresponding to the first item to the playlist selected by the user as illustrated in FIG. 9c. For example, in case that a user input that selects a playlist "All" is received, the mobile device 300 may add the web page corresponding to the first item to the playlist "All".

According to various embodiment as described above, the mobile device 300 may manage a web page selected by the user by using an application that provides a reconstructed content corresponding to a web page. Here, the mobile device 300 may execute and manage the application that provides a reconstructed content corresponding to a web page in association with the server 200. That is, the mobile device 300 may transmit, to the external server 200, information on the web page selected by the user, information on a playlist added by the user, information on an application selected by the user, information on arrangement of web pages of a playlist, and the like.

FIG. 10 is a flowchart for describing a content reconstruction method of the server according to an embodiment of the disclosure. Meanwhile, according to an embodiment of the disclosure, the server 200 may be in a state in which the user is logged in on a specific user account.

First, the server 200 may obtain information on a web page selected by the user (S1010). Specifically, the server 200 may receive, from the mobile device 300 or the display device 100, the information on the web page selected by the user. For example, the server 200 may receive the information on the web page selected (for example, saved, shared, or bookmarked) by the user as illustrated in FIGS. 5a to 6d. Here, the information on the web page may include domain information (for example, URL information) of the web page, but this is only an example. The information on the web page may include various information such as metadata, a hashtag, and the like included in the web page.

The server 200 may determine the type of the web page based on the information on the web page (S1020). Particularly, the server 200 may determine the type of the web page based on the domain information of the web page. For example, in case that the domain information includes an address (for example, www.cnn.com) of a web page that provides an article content, the server 200 may determine the type of the web page as the article web page. As another example, in case that the domain information includes an address (for example, www.youtube.com or www.vimeo.com) of a web page that provides a video content, the server 200 may determine the type of the web page as the video web page. As another example, in case that the domain information includes an address (for example, www.instagram.com) of a web page that provides an image content, the server 200 may determine the type of the web page as the image web page.

The server 200 may reconstruct the web page based on the determined type of the web page to obtain a reconstructed content (S1030). Specifically, the server 200 may remove an unnecessary element included in the determined web page, such as an advertisement element or a pop-up element. In addition, in case that the type of the web page is the video web page or image web page, the server 200 may obtain a reconstructed content including only an image element or video element based on a source address (for example, a source URL) of the image element or video element among elements included in the image web page or video web page. Further, in case that the type of the web page is the article web page, the server 200 may obtain a reconstructed content including a plurality of pages obtained by reconstructing elements of the web page based on at least one of the type or the content of the elements included in the web page. Specifically, the server 200 may classify the elements included in the selected web page into a text element, an image element, and a video element, and obtain a plurality of pages each including at least one type of element among the text element, the image element, and the video element. Here, in case that one page includes a plurality of types of elements, the server 200 may obtain a page in which the plurality of elements included in one page include relevant contents. A method in which the server 200 obtains a reconstructed content based on the article web page will be described later in detail.

The server 200 may transmit the reconstructed content to the display device 100 (S1040). Here, in case that a signal for requesting the reconstructed content is received from the display device 100, the server 200 may transmit the reconstructed content corresponding to the web page in response to the signal, but this is only an example. The server 200 may periodically transmit, to the display device 100, the reconstructed content corresponding to the web page.

Meanwhile, the server 200 may extract an element (or data) included in a web page according to the type of the web page. As shown in the following Table 1, the server 200 may determine a type of a web page based on a domain of the web page and extract an element included in the determined web page.

TABLE 1

| Domain | Type | Element Extraction Definition | Element Source Information |
| --- | --- | --- | --- |
| Youtube | Video | Extraction of Video URL | www.youtube.com/xxxxxxxxx (video source) |
| Instagram | Image | Extraction of Image URL | www.Instagram.com/abcdetf . . . (image source) |
| Vimeo | Video | Extraction of Video URL | www.vimeo.com/xxxxxxxxx |
| CNN | Article | Reconstruction in unit of page after extracting text of article | Myspace_cnn.html Myspace_cnn.css Myspace_cnn.js |

Further, the server 200 may determine a recommended content based on user information and information on a web page. For example, as shown in the following Table 2, the server 200 may match and store user information and information on a web page, and provide a recommended content based on the stored information.

TABLE 2

| User | Age (Gender) | Original URL | Metadata |
| --- | --- | --- | --- |
| James | 27 (Male) | www.youtube.com/1 | Title, Category, Hashtag . . . |
| James | 27 (Male) | www.instagram.com/2 | Title, Category, Hashtag . . . |
| Amy | 27 (Female) | www.cnn.com/3 | Title, Category, Hashtag . . . |
| Amy | 27 (Female) | www.abc.com/4 | Title, Category, Hashtag . . . |

Figure 11:
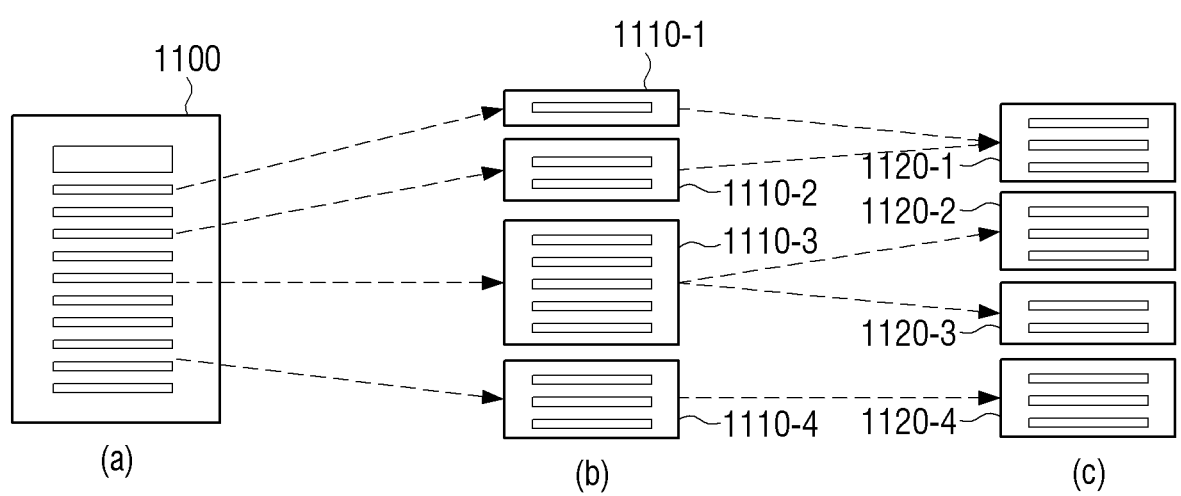
FIGS. 11 and 12 are diagrams for describing a method in which the server reconstructs an article web page according to an embodiment of the disclosure.
Figure 12:
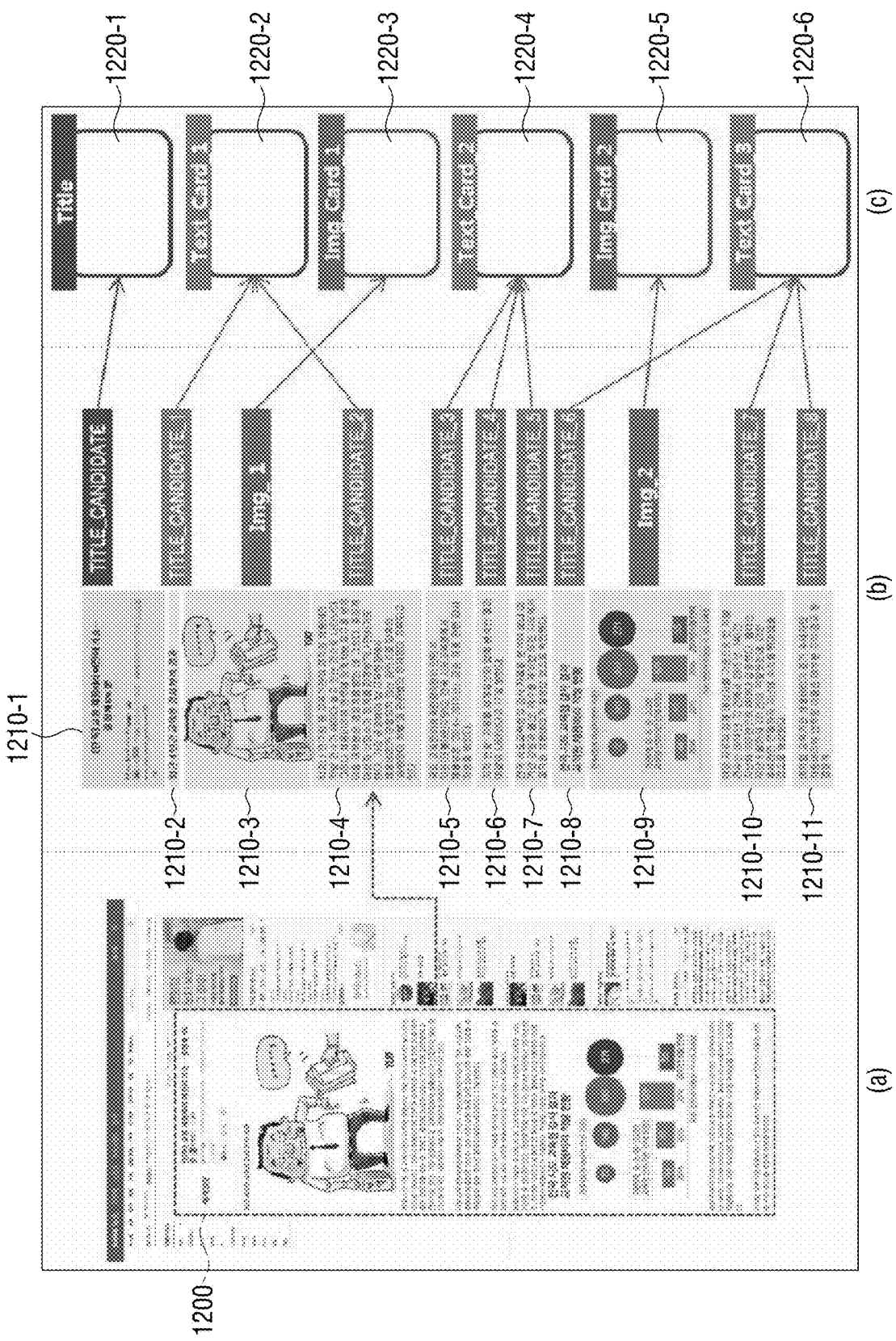

FIGS. 11 and 12 are diagrams for describing a method in which the server reconstructs the article web page according to an embodiment of the disclosure. Specifically, in case that the type of the web page is the article web page, the server 200 may obtain a reconstructed content including a plurality of pages obtained by reconstructing elements of the web page based on at least one of the type or the content of the elements included in the web page.

Specifically, the server 200 may obtain information on the article web page. Here, the information on the article web page may a hypertext markup language (HTML) source of the web page. Further, the server 200 may remove an advertisement element or pop-up element which is unnecessary to generate the reconstructed content based on the HTML source of the web page. In addition, the server 200 may extract an element such as a title, a text, an image, or a video from the obtained HTML source of the web page. Specifically, the server 200 may separately extract a title as a title element. Further, the server 200 may split a text into a plurality of groups based on a predetermined number of characters in the text to be split into groups. Specifically, in case that an article web page as illustrated in (a) of FIG. 11, the server 200 may split a text each predetermined number of characters (for example, each 150 to 250 characters in English). Here, the server 200 may use significant HTML information and may omit insignificant HTML information. For example, the server 200 may split the text by using HTML information such as <div>, <p>, or <br>, and recognize an image element or video element which is a media content by using HTML information such as <img> or <video>. The server 200 may primarily split the text by using the HTML information as illustrated in (b) of FIG. 11. Here, the server 200 may primarily slit the text in a unit of paragraph. Further, the server 200 recognizes a media content in an HTML class. In case that the media content is present above a text group, the server 200 may designate the text group as a previous page, and in case that the media content is present below the text group, the server 200 may designate the text group as a next page. Further, the server 200 may secondarily split the text according to a predetermined number of characters in the text as illustrated in (c) of FIG. 11.

For example, the server 200 may obtain information on a web page including an article content 1200 as illustrated in (a) of FIG. 12. Here, the server 200 may remove a boilerplate (for example, an advertisement element or a pop-up element) except for the article 1200 among contents included in the web page.

Further, the server 200 may split the article content 1200 into a text element 1210-1, text elements 1210-2, 1210-4 to 1210-8, 1210-10, and 1210-11, and image elements 1210-3 and 1210-9 as illustrated in (b) of FIG. 12 by using HTML information as described above.

Further, the server 200 may generate a plurality of pages with the text elements 1210-2, 1210-4 to 1210-8, 1210-10, and 1210-11 among the plurality of extracted elements based on positions of the text elements and the number of characters in each text element. For example, as illustrated in (c) of FIG. 12, the server 200 may obtain a reconstructed content including a first card (or first page) 1220-1 including a title element, a second card (or second page) 1220-2 including first and second text elements 1210-2 and 1210-4, a third card (or third page) 1220-3 including a first image element 1210-3, a fourth card (or fourth page) 1220-4 including third and fifth text elements 1210-5 to 1210-7, a fifth card (or fifth page) 1220-5 including a second image element 1210-9, and a sixth card (or sixth page) 1220-6 including sixth to eighth text elements 1210-8, 1210-10, and 1210-11. The server 200 may obtain a reconstructed content including a plurality of pages based on types of elements.

Here, the server 200 may obtain the plurality of pages each including a plurality of types of elements. For example, the server 200 may obtain one card (or page) including the first and second text elements 1210-2 and 1210-4 and the first image element 1210-3. Here, the first and second text elements 1210-2 and 1210-4 and the first image element 1210-3 may include relevant contents. That is, the server 200 may obtain a reconstructed content including a plurality of pages based on contents of elements included in the article content.

Meanwhile, according to an embodiment of the disclosure, the server 200 may obtain a reconstructed content including a plurality of pages by using a model trained using an artificial intelligence algorithm. Here, the trained model may be a model trained to obtain a reconstructed content including a plurality of pages and corresponding to the article content by using the article content as input data.

With the method as described above, the server 200 may obtain a reconstructed content based on the type of a web page.

FIGS. 13 to 26 are views for describing methods in which the display device provides a reconstructed content according to various embodiments of the disclosure.

Figure 13:
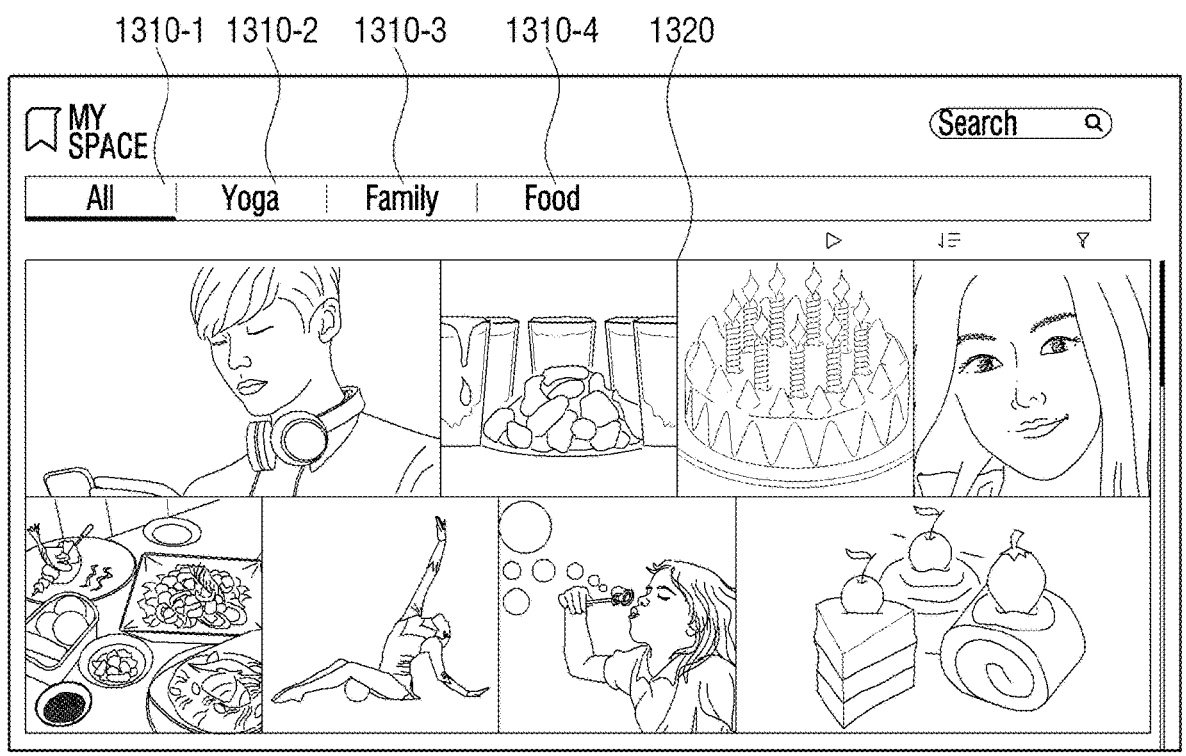

The display device 100 may execute an application that provides a reconstructed content for a web page according to a user input. Once the application is executed, the display device 100 may display an application execution screen as illustrated in FIG. 13. Here, the application execution screen may include a plurality of tabs 1310-1 to 1310-4 representing a plurality of playlists (or categories), and may include a list 1320 for a playlist corresponding to a tab selected among the plurality of tabs. Here, the list 1320 may include a plurality of items corresponding a plurality of web pages included in the playlist corresponding to the selected tab.

In case that a user input that selects one of the plurality of items is received, the display device 100 may provide a reconstructed content for a web page corresponding to the selected item.

Particularly, in case that a user input that selects an item corresponding to an article web page among the plurality of items is received, the display device 100 may provide a reconstructed content including a plurality of pages obtained by reconstructing elements of the selected web page based on at least one of the type or the content of the elements included in the selected web page.

Figure 14:
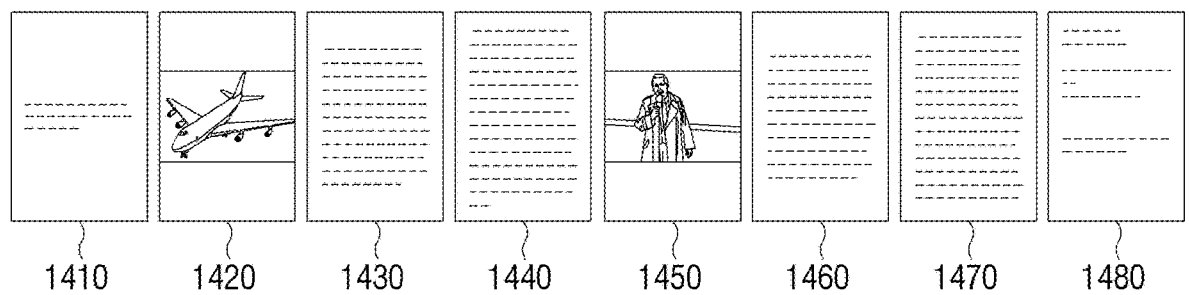

Specifically, in case that the user input that selects an item corresponding an article web page is received, the display device 100 may obtain, from the external server 200, a reconstructed content including a plurality of pages 1410 to 1480 included in a reconstructed content corresponding to the selected article web page as illustrated in FIG. 14. Here, the plurality of pages 1410 to 1480 may include a page including a text element, a page including an image element, and a page including a video element.

Figure 15:
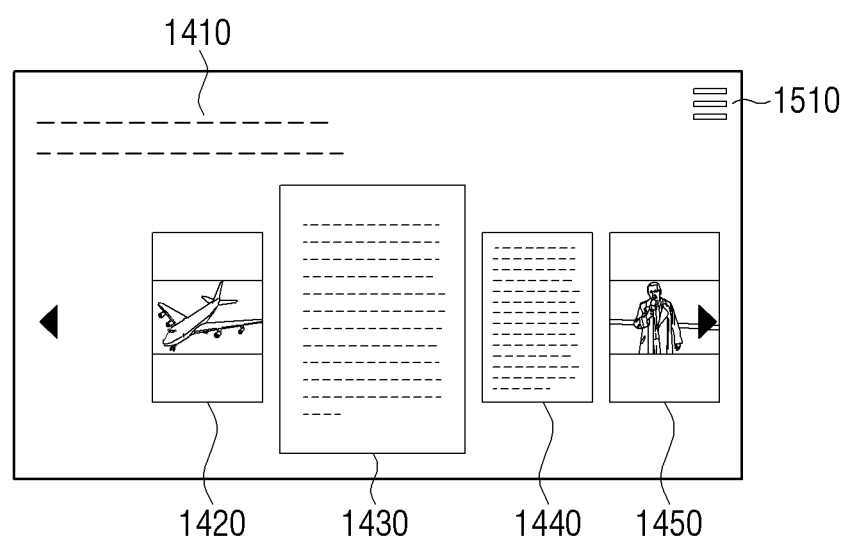
Figure 17:
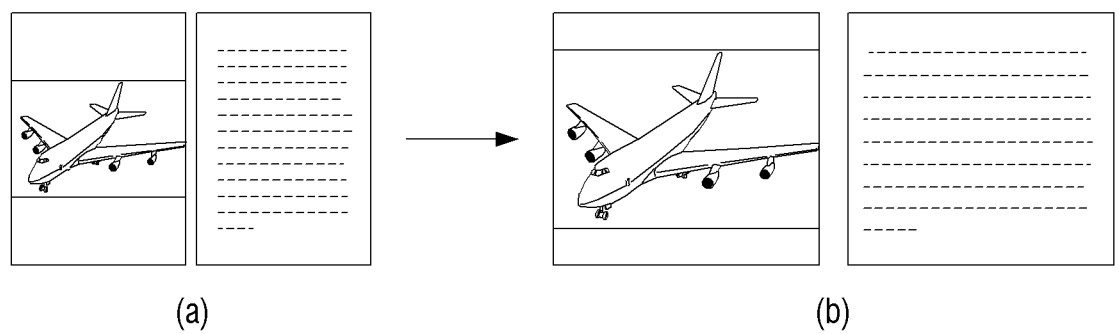

The display device 100 may display the reconstructed content based on the plurality of pages. Specifically, the display device 100 may display the title page 1410 of the plurality of pages on the upper side of the display screen and display some pages 1420 to 1450 of the plurality of pages at the center of the display screen as illustrated in FIG. 15. Further, the display device 100 may display an icon 1510 for displaying a list including a setting item related to the application. Meanwhile, although the case that the number of pages displayed at the center of the display screen is four has been described above, this is only an example and the number of displayed pages may be other than four. Here, the number of pages may be set in advance at the time of manufacturing, but this is only an example. The number of pages may be set by the user.

Here, the display device 100 may display one page 1430 of the plurality of pages 1420 to 1450 displayed at the center in a larger size than other pages. Here, the number of pages displayed in an enlarged state at the center of the display screen may be one, but this is only an example. A plurality of pages may be displayed in an enlarged state at the center of the display screen according to user setting. For example, in case that setting is performed to display one page in an enlarged state, the display device 100 displays only the second page 1430 in an enlarged state as illustrated in a view on the upper side of FIG. 16, in case that setting is performed to display two pages in an enlarged state, the display device 100 displays the first and second pages 1420 and 1430 in an enlarged state as illustrated in a view on the middle side of FIG. 16, and in case that setting is performed to display three pages in an enlarged state, the display device 100 displays the first to third pages 1420 to 1440 in an enlarged state as illustrated in a view on the lower side of FIG. 16. Further, the display device 100 may highlight one of the plurality of pages, and display the highlighted page in an enlarged state.

Further, the display device 100 may determine an aspect ratio of a page based on a display attribute (for example, a resolution, a screen ratio, or a screen size) of the display device 100. For example, in case that a screen ratio (for example, 9:16) of the display device 100 is a first screen ratio, the display device 100 may obtain a page having an aspect ratio as illustrated in (a) of FIG. 17, and in case that the screen ratio of the display device 100 is a second screen ratio (for example, 1:1), the display device may obtain a page having an aspect ratio as illustrated in (b) of FIG. 17.

Further, the display device 100 may control a reconstructed content including a plurality of pages by using four direction keys (left, right, up, and down) and a confirm key.

Figure 18:
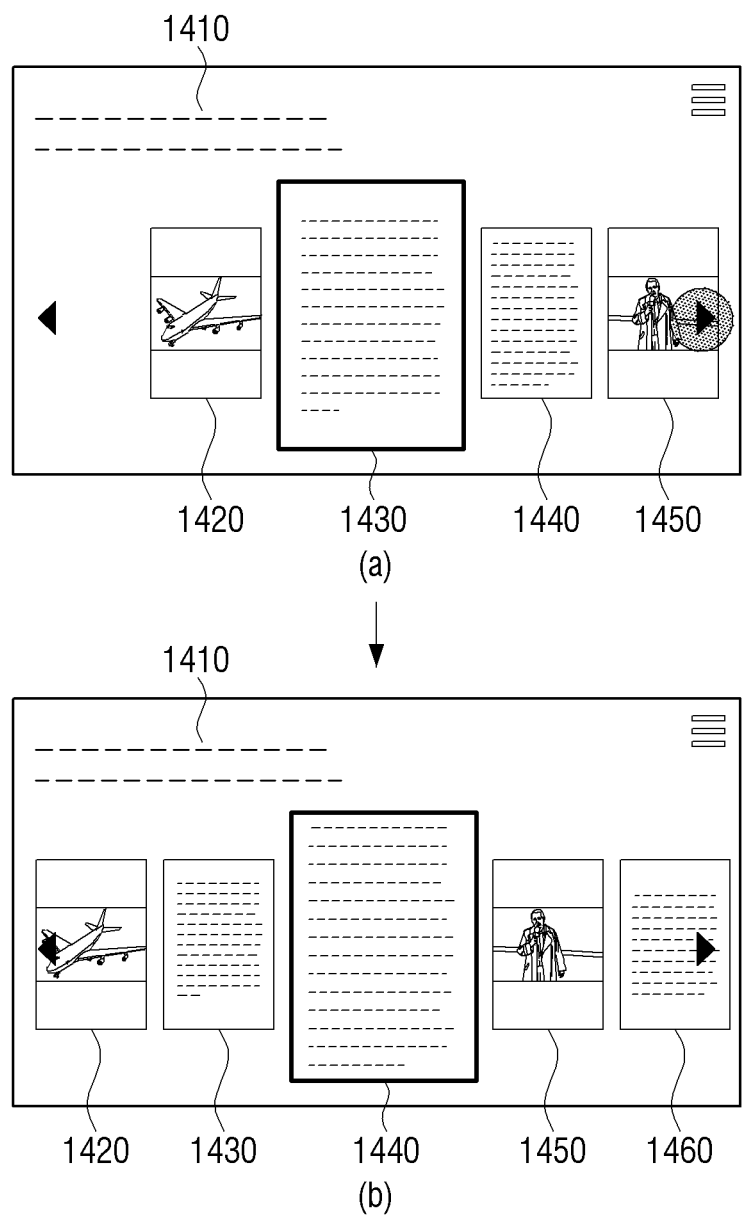

Specifically, the display device 100 may highlight one page 1430 as illustrated in (a) of FIG. 18. Here, the highlighted page 1430 may be displayed in an enlarged state. In case that a remote controller signal corresponding to selection of a right direction button is received in a state in which the page 1430 is highlighted, the mobile device 100 may move the highlight to the right to highlight the page 1440, and may display the page 1440 in an enlarged state as illustrated in (b) of FIG. 18. In case that a remote controller signal corresponding to selection of a confirm button is received in a state in which one of the plurality of pages is highlighted, the display device 100 may display the highlighted page in an enlarged state over the entire screen, or may change a reproduction status (for example, from stop to play).

Figure 19:
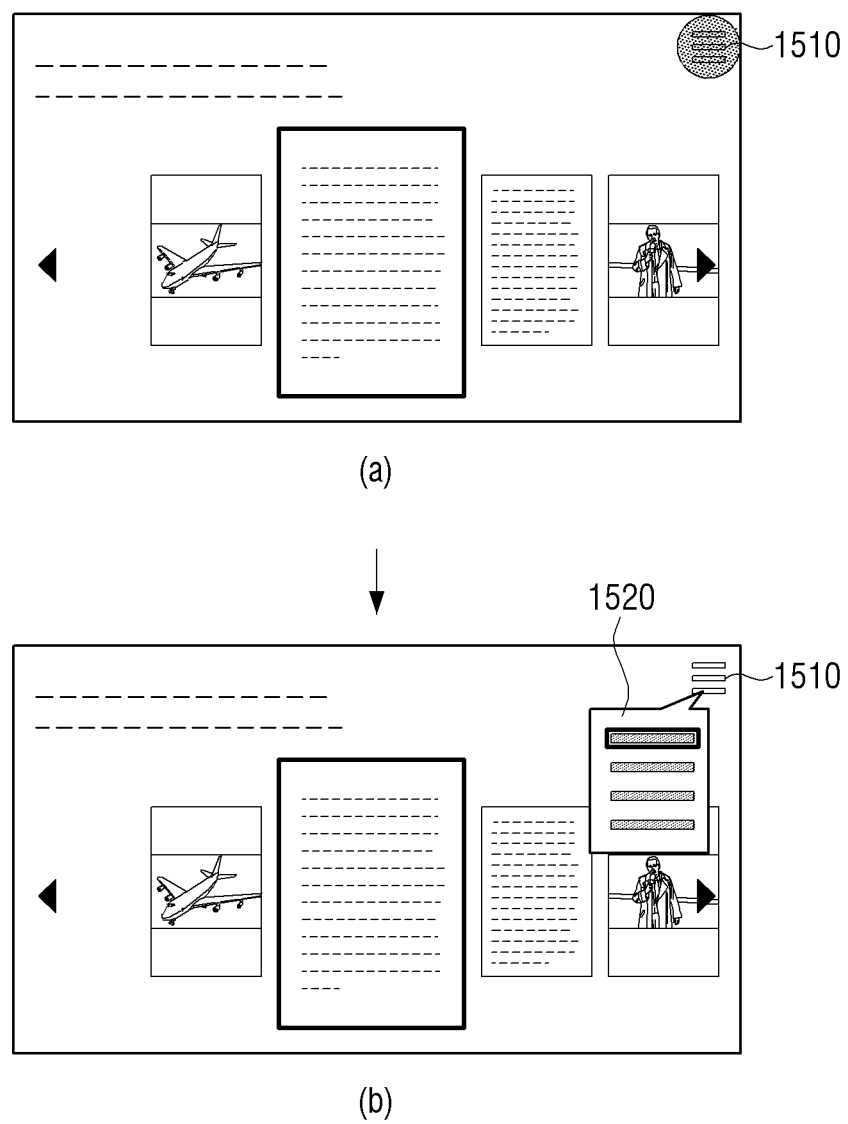

Alternatively, as illustrated in (a) of FIG. 18, in case that a remote controller signal corresponding to selection of an up direction button is received while the page 1430 is highlighted, the display device 100 may move the highlight to an icon 1510 displayed on the upper side as illustrated (a) of FIG. 19. Further, in case that a remote controller signal corresponding to selection of the confirm button is received while the icon 1510 is highlighted, the display device 100 may display a list 1520 for controlling the application that provides a reconstructed content corresponding to a web page as illustrated in (b) of FIG. 19.

Figure 20A:
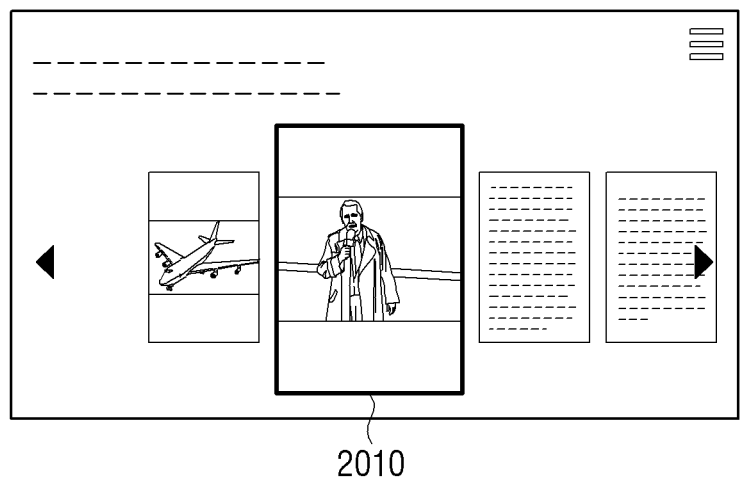

In case that an image element is included in a page 2010, the display device 100 may display the page 2010 based on an aspect ratio of the image element. That is, in case that an aspect ratio of the page 2010 is 9:16, and the aspect ratio of the image element is 16:9, the display device 100 may process the page 2010 to display the image element in an aspect ratio of 16:9 and display the remaining region as a blurred region or blank region as illustrated in FIG. 20a. Further, in case that a remote controller signal corresponding to selection of the confirm button is received while the page 2010 including the image element is highlighted, the display device 100 may display a pop-up window including the image element that is enlarged, or enlarge the image element to cover the entire screen.

Figure 20B:
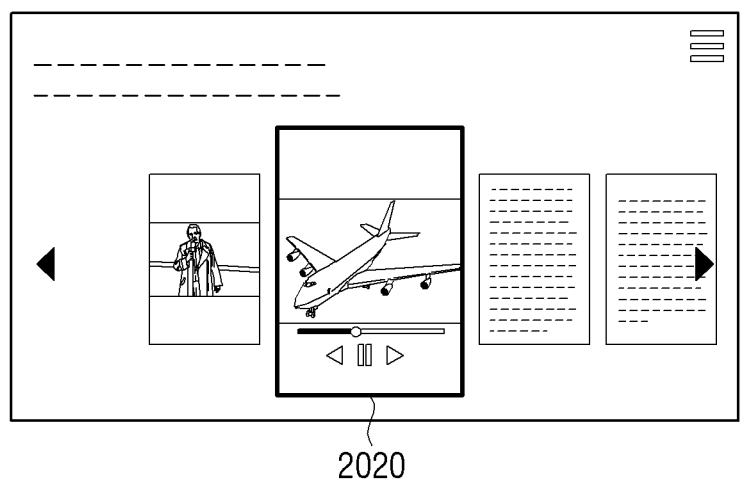

Further, in case that a video element is included in a page 2020, the display device 100 may display the page 2020 to include a thumbnail image of the video element. Here, in case that a remote controller signal corresponding to selection of the confirm button is received while the page including the video element 2020 is highlighted, the display device 100 may display a video control menu in the page 2020 as illustrated in FIG. 20b. Here, the control menu may include various items such as "rewind", "play/stop", "skip", and a progress bar.

Figure 21A:
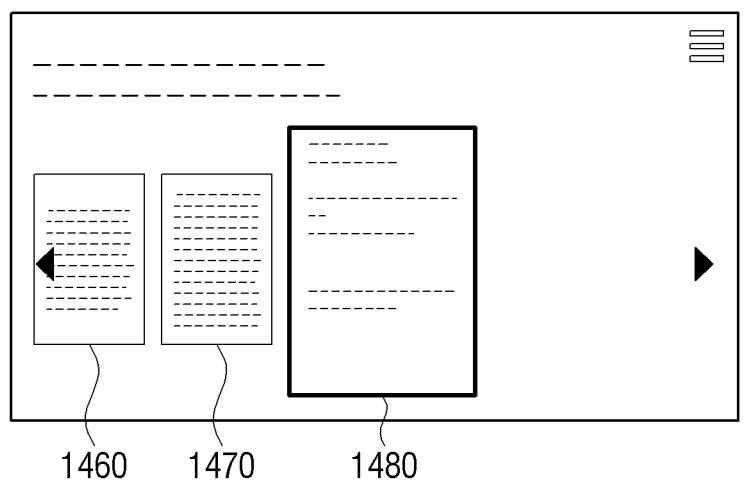
Figure 21B:
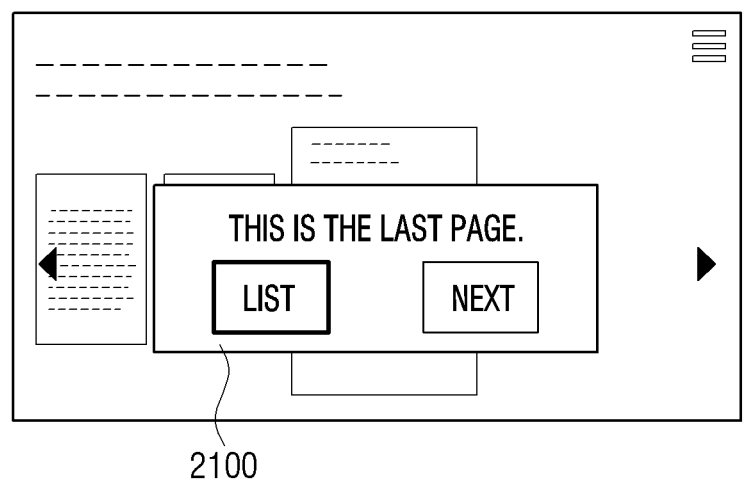

Further, the display device 100 may highlight the last page 1480 of the plurality of pages as illustrated in FIG. 21a. In case that a remote controller signal corresponding to selection of the confirm button is received while the last page 1480 of the plurality of pages is highlighted, the display device 100 may display a pop-up window 2100 indicating that this is the last screen as illustrated in FIG. 21b. Here, the pop-up window 2100 may include a message indicating that the current page is the last page, a "list" icon for returning to the screen including the list including the plurality of items corresponding to the plurality of web pages, and a "next" icon for displaying a reconstructed content corresponding to a next web page.

Figure 22:
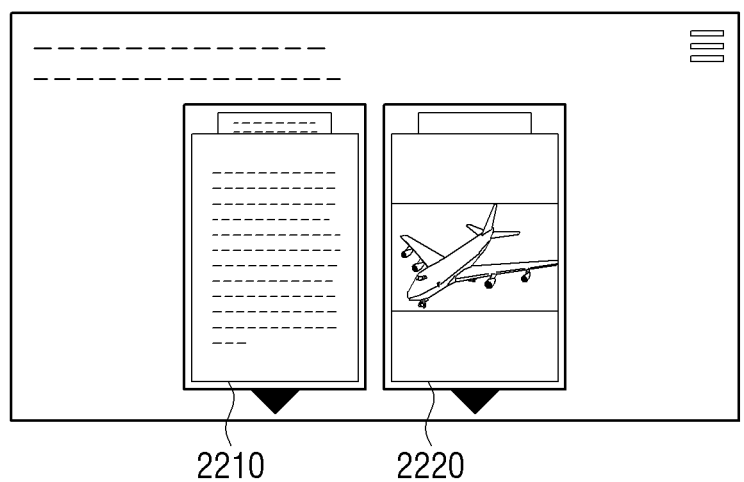

Meanwhile, although the case that the reconstructed content is provided based on an order of the pages has been described in the embodiment described above, this is only an example and the reconstructed content may be provided based on the type of an element included in a page. For example, as illustrated in FIG. 22, a page including a text element may be displayed in a first region 2210, and a page including an image element or video element may be displayed in a second region 2220. Here, the page displayed in the first region 2210 and the page displayed in the second region 2220 may include relevant contents. That is, in case that a user input (for example, a remote controller signal corresponding to selection of an up/down direction button) for changing the page displayed in the first region 2210 with a next page is received, the display device 100 may display a new page including an image element related to a text element of the next page in the second region 2220.

Figure 23:
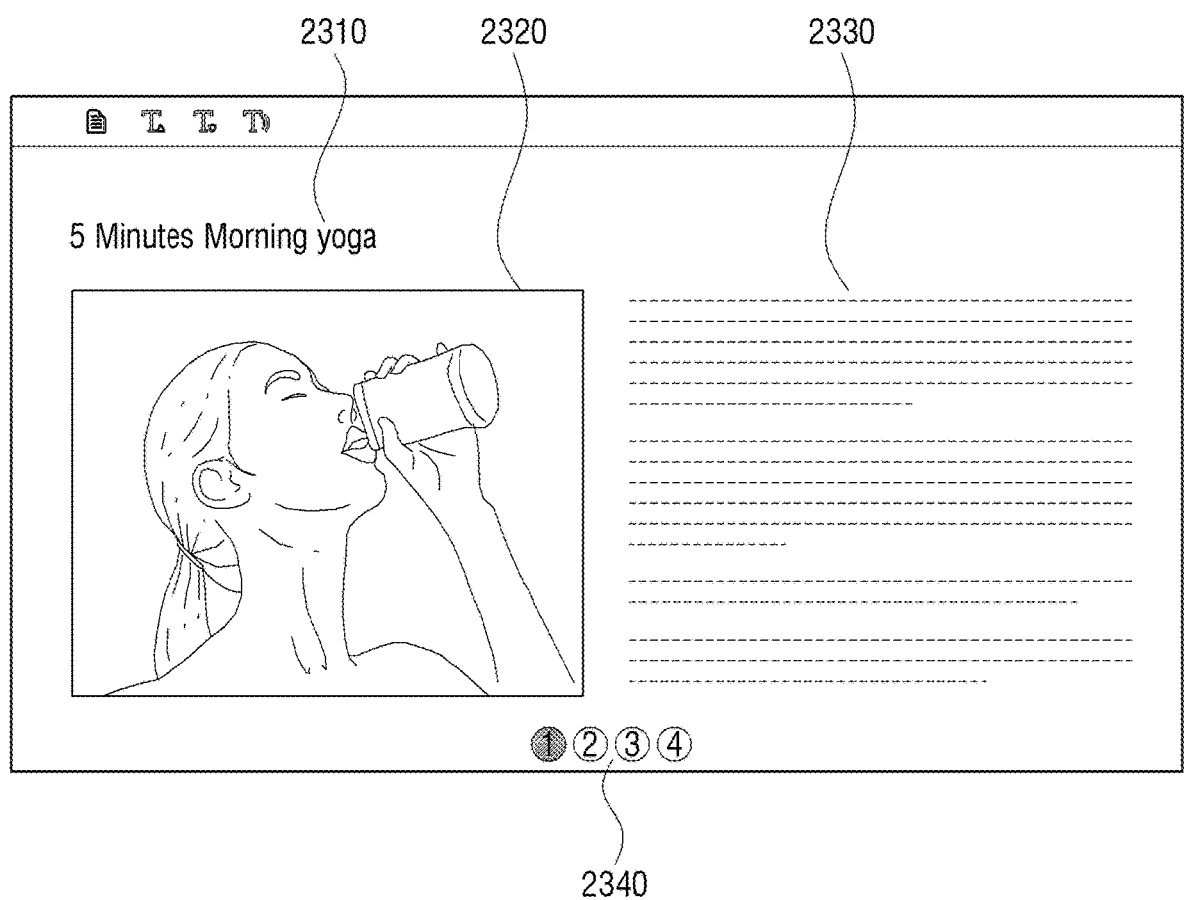

Meanwhile, although the case that a plurality of pages are displayed on the display screen at the same time has been described in the embodiment described above, this is only an example, and only one page may be displayed on the display screen. Here, the one page may include a plurality of types of elements. For example, as illustrated in FIG. 23, the display device 100 may display a page screen including a title element 2310, an image element 2320, and a text screen 2330. Here, the display screen may display a UI 2340 indicating a position of a current page.

Particularly, in case that a user input that selects an item corresponding to an image web page or video web page among the plurality of items is received, the display device 100 may provide a reconstructed content including only an image element or video element extracted based on a source address of the image element or video element among elements included in the image web page or video web page.

Figure 24A:
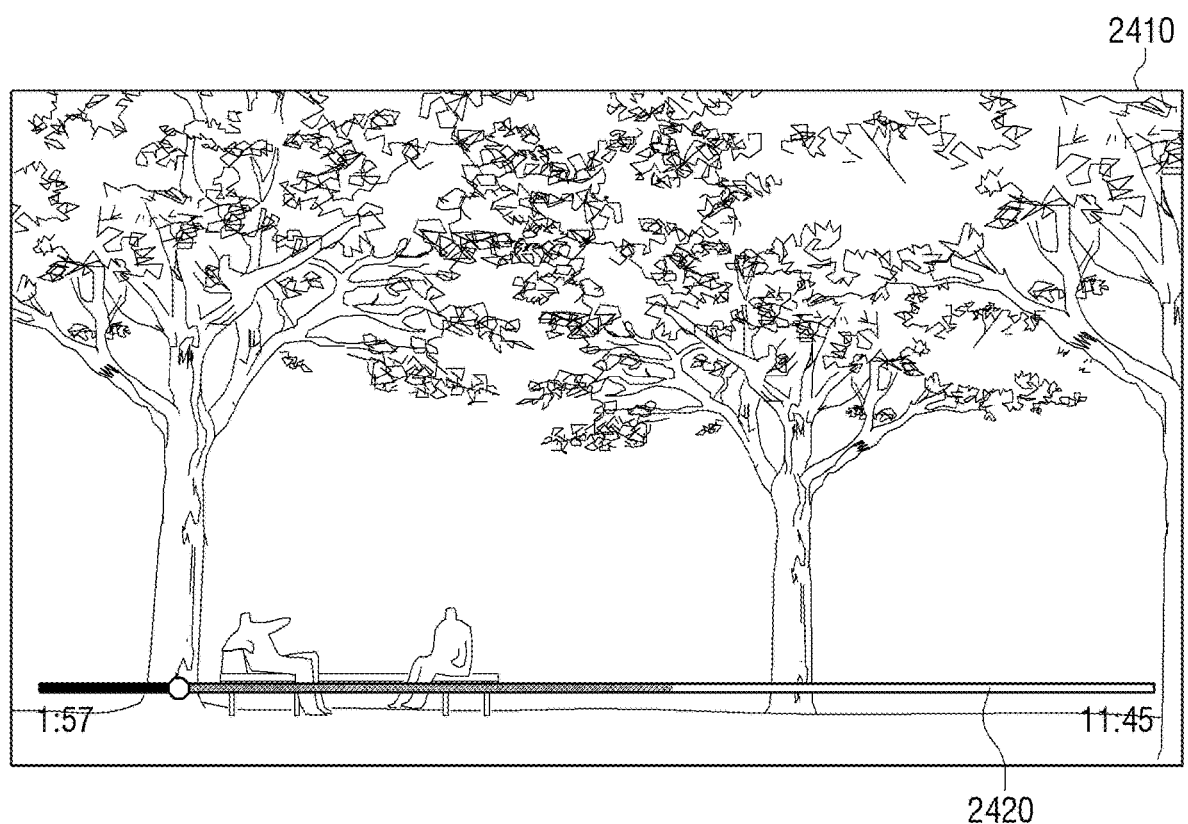

For example, in case that a user input that selects an item corresponding to the video web page is received, the display device 100 may extract only a video based on source information of the video included in the video web page and display a video 2410 over the entire screen as illustrated in FIG. 24a. Here, in the entire screen, a progress bar 2420 indicating reproduction of the video 2410 may be displayed.

Figure 24B:
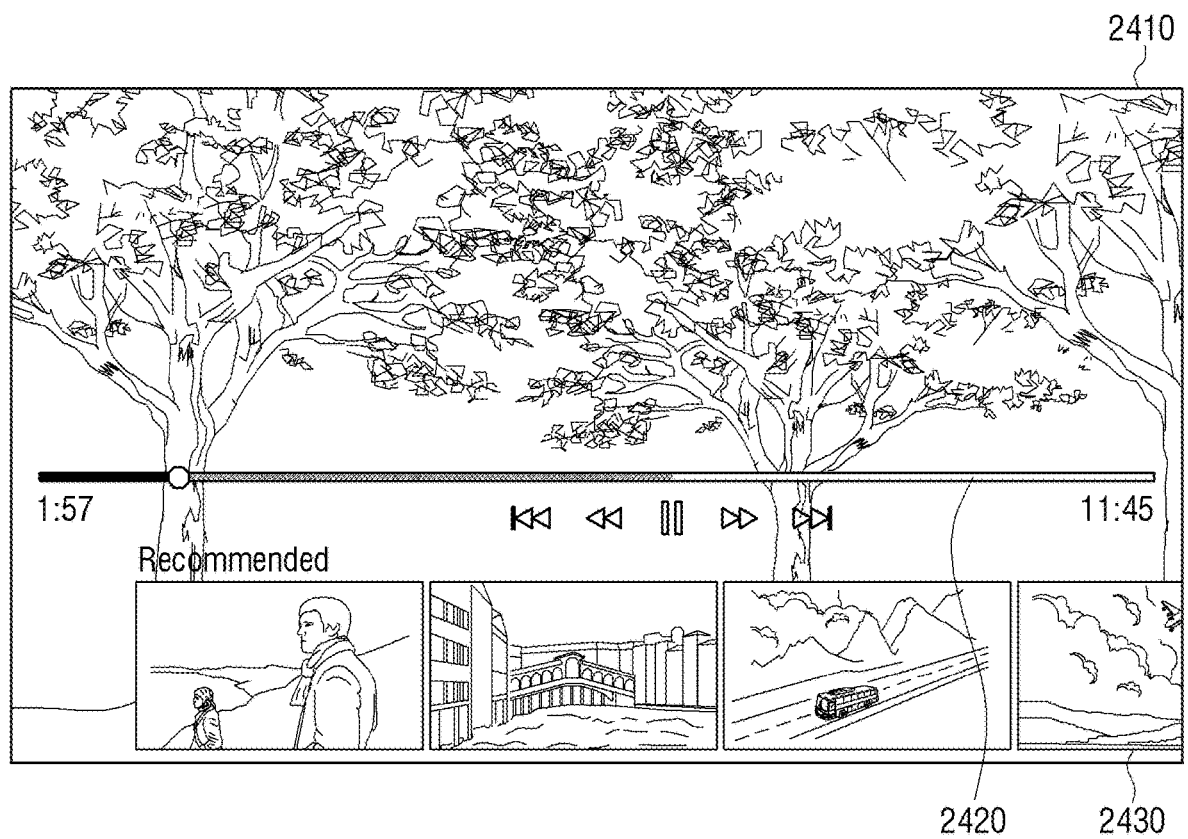
Figure 24C:
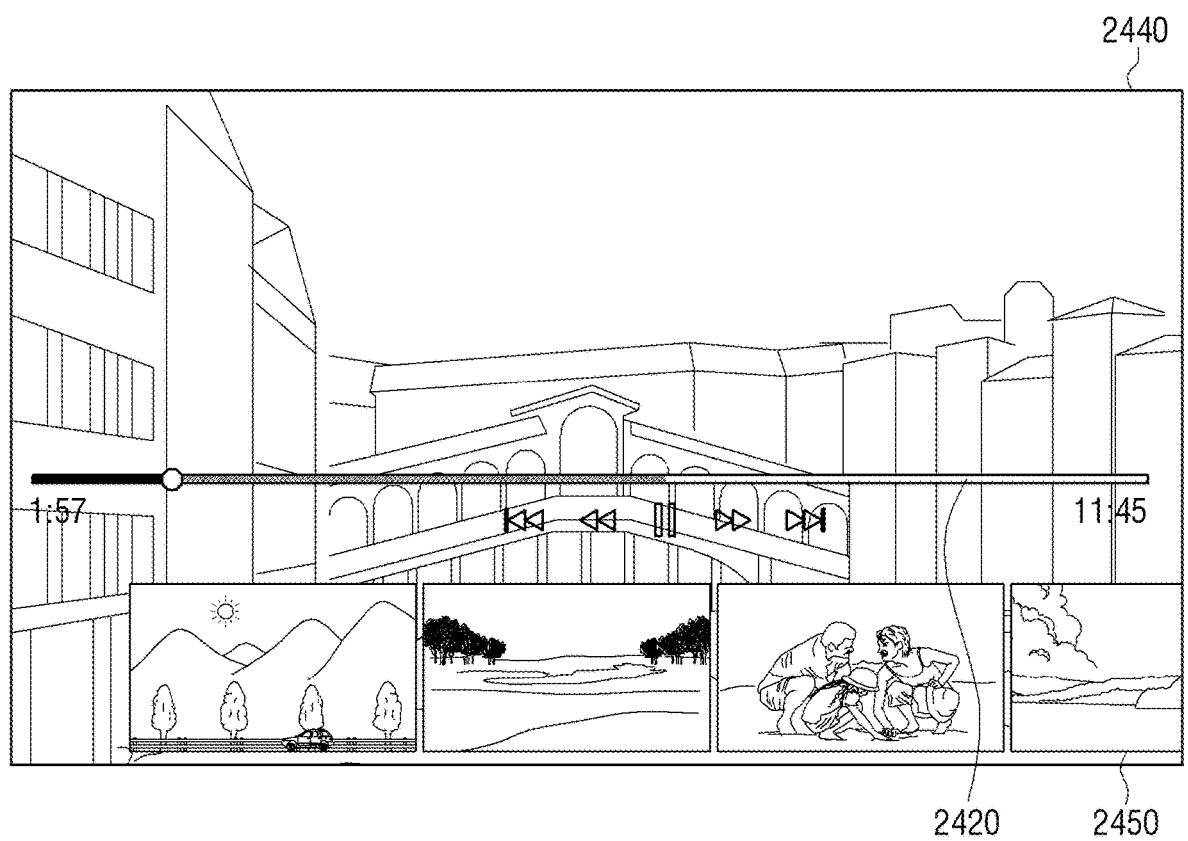

Further, in case that a user input for receiving a recommended content related to the video 2410 is received, the display device 100 may obtain information on a recommended content obtained based on information on the currently reproduced video 2410 and user information, and display a recommended content list 2430 on the lower side of the display screen as illustrated in FIG. 24b based on the information on the recommended content. In case that a user input that selects one of recommended contents included in the recommended content list 2430 is received, the display device 100 may display a recommended content 2440 based on information on the recommended content selected by the user as illustrated in FIG. 24c, and display a recommended content list 2450 including new recommended contents based on information on the new recommended contents determined based on the information on the recommended content 2440 selected by the user and user information.

Further, in case that at least two of the plurality of web pages are selected through the inputter, the display device 100 may sequentially display at least two reconstructed contents corresponding to the at least two selected web pages.

Figure 25:
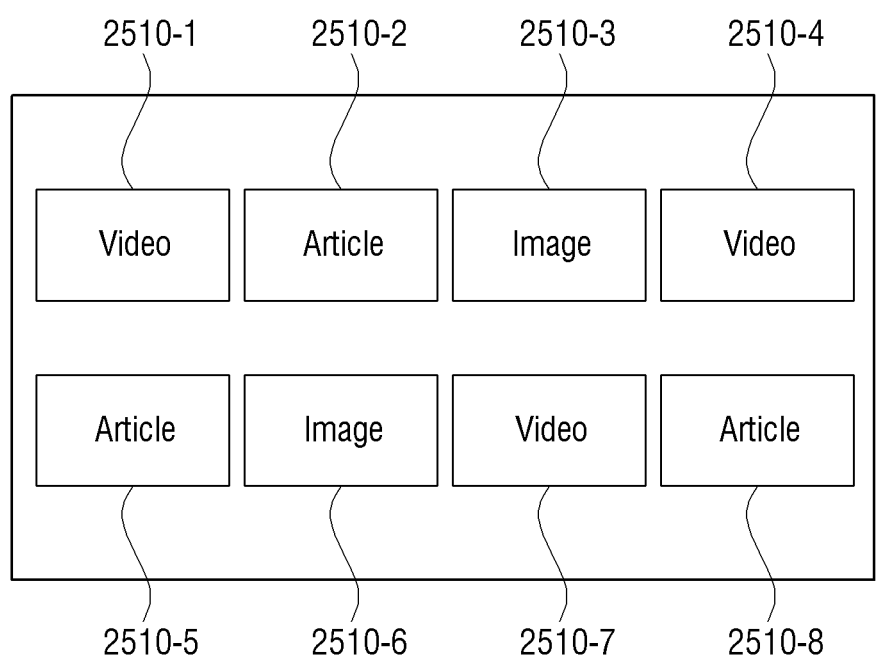

Specifically, the display device 100 may display a list including a plurality of items 2510-1 to 2510-8 corresponding to a plurality of web pages as illustrated in FIG. 25. Here, first, fourth, and seventh items 2510-1, 2510-4, and 2510-7 among the plurality of items 2510-1 to 2510-8 may correspond to video web pages, second, fifth, and eighth items 2510-2, 2510-5, and 2510-8 may correspond to article web pages, and third and sixth items 2510-3 and 2510-6 may correspond to image web pages.

Here, in case that a user input that selects the first to fourth items 2510-1 to 2510-4 among the plurality of items is received, the display device 100 may sequentially display reconstructed contents of the web pages corresponding to the selected first to fourth items 2510-1 to 2510-4. For example, the display device 100 may reproduce a first reconstructed content corresponding to the first item 2510-1 during a first section as illustrated in (a) of FIG. 26, reproduce a second reconstructed content corresponding to the second item 2510-2 during a second section as illustrated in (b) of FIG. 26, reproduce a third reconstructed content corresponding to the third item 2510-3 during a third section as illustrated in (c) of FIG. 26, and reproduce a fourth reconstructed content corresponding to the fourth item 2510-4 during a fourth section as illustrated in (d) of FIG. 26. Here, the display device 100 may display a menu for controlling reproduction of four reconstructed contents or representing the reproduction of the reconstructed contents in one region of the display screen as illustrated in FIG. 26 while the four reconstructed contents are sequentially output. That is, the display device 100 may reproduce the four reconstructed contents as if they are one content. Further, the display device 100 may provide reconstructed contents corresponding to different types of web pages through one comprehensive content viewer.

Meanwhile, a reproduction time of a reconstructed content corresponding a video web page may be determined depending on a reproduction time of a video included in the video web page, a reproduction time of a reconstructed content corresponding an image web page may be determined based on a predetermined reproduction time, and a reproduction time of a reconstructed content corresponding an article web page may be determined depending on the number of characters of a text of each of a plurality of pages included in the reconstructed content. Further, the user may check a reproduction point of a reconstructed content corresponding to a current article web page through highlighting of a text or audio sound output based on a text-to-speech (TTS) technology.

As described above, as various types of web pages are integrally provided and a reconstructed web page is provided to the user, it is possible not only to improve convenience of the user, but also to provide a new user experience.

Figure 27:
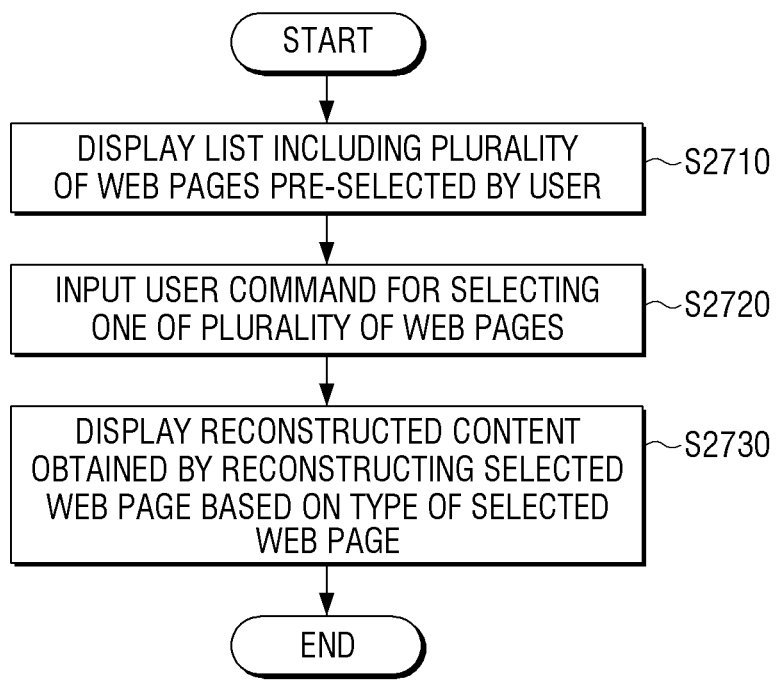
FIG. 27 is a flowchart for describing a content providing method of the display device according to an embodiment of the disclosure.

FIG. 27 is a flowchart for describing a content providing method of the display device according to an embodiment of the disclosure.

First, the display device 100 may display a list including a plurality of web pages pre-selected by the user (S2710). Specifically, the display device 100 may display a list including a plurality of items corresponding to the web pages selected in the mobile device 300 or display device 100.

Then, the display device 100 may receive a user input for selecting one of the plurality of web pages (S2720). Here, the display device 100 may receive the user input for selecting one of the plurality of web pages by receiving a remote controller signal.

The display device 100 may display a reconstructed content obtained by reconstructing the selected web page based on the type of the selected web page (S2730). Specifically, the display device 100 may receive, from the external server 200, information on the reconstructed content corresponding to the web page selected by the user and provide the reconstructed content based on the received information on the reconstructed content.

The term "-er/or" or "module" used in the disclosure includes a unit implemented by hardware, software, or firmware, and may be interchangeably used with a term such as "logic", "logic block", "part", or "circuit". A module may be an integrated part, a minimum unit to perform one or more functions, or a part thereof. For example, a module may be implemented by an application-specific integrated circuit (ASIC).

Various embodiments of the disclosure may be implemented by software including instructions stored in a machine-readable storage medium (for example, a computer-readable storage medium). The machine is an apparatus that may invoke a stored instruction from a storage medium and may be operated according to the invoked instruction. The machine may include an electronic device (for example, the display device 100 or mobile device 300) according to the disclosed embodiments. In case that the instruction is executed by the processor, the processor may directly perform a function corresponding to the instruction or other components may perform the function corresponding to the instruction under a control of the processor. The instruction may include codes created or executed by a compiler or an interpreter. The machine-readable storage medium may be provided in a form of a non-transitory storage medium. Here, the term "non-transitory" means that the storage medium is tangible without including a signal, and does not distinguish whether data is semi-permanently or temporarily stored on the storage medium.

According to an embodiment, the methods according to the various embodiments of the document may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In case of the online distribution, at least a part of the computer program product may be at least temporarily stored in a storage medium such as a memory of a server of a manufacturer, a server of an application store, or a relay server or be temporarily created.

In addition, each of components (for example, modules or programs) according to the various embodiments may be implemented as a single entity or a plurality of entities, and some of the corresponding sub-components described above may be omitted or other sub-components may be further included in the various embodiments. Alternatively or additionally, some of the components (for example, modules or programs) may be integrated into one entity, and may perform functions performed by the respective corresponding components before being integrated in the same or similar manner. Operations performed by the modules, the programs, or other components according to the various embodiments may be performed in a sequential manner, a parallel manner, an iterative manner, or a heuristic manner, at least some of the operations may be performed in a different order or be omitted, or other operations may be added.

The invention claimed is:

1. A content providing method of a display device, the content providing method comprising:
   displaying a list including a plurality of web pages pre-selected by a user; and sequentially displaying, based on a user command for selecting at least a first web page and a second web page of the plurality of web pages being input, at least a first reconstructed content and a second reconstructed content corresponding to a determined first type of the selected first web page and a determined second type of the selected second web page, respectively;
   wherein the first reconstructed content and the second reconstructed content include a first set of plurality of pages and a second set of plurality of pages, respectively, obtained by extracting a first set of elements and a second set of elements according to the determined first type of the selected first web page and the determined second type of the selected second web page, respectively, among a first plurality of elements and a second plurality of elements included in the selected first web page and the selected second web page, respectively, wherein one of the extracted first set of elements and the second set of elements excludes an advertisement element and a pop-up element;

wherein the sequentially displaying of the at least first reconstructed content and the second reconstructed content includes displaying a control menu for controlling reproduction of the at least first reconstructed content and the second reconstructed content together as one content in one region of a display screen of the display device while the at least first reconstructed content and the second reconstructed content are sequentially output in another region of the display screen.

2. The content providing method as claimed in claim 1, wherein one of the determined first type of the selected first web page and the determined second type of the selected second web page is determined depending on a domain of one of the selected first web page and the selected second web page.

3. The content providing method as claimed in claim 1, wherein based on one of the determined first type of the selected first web page and the determined second type of the selected second web page being an article web page, one of the first reconstructed content and the second reconstructed content including the first set of plurality of pages and the second set of plurality of pages respectively, obtained by extracting the first set of elements and the second set of elements according to the determined first type of the selected first web page and the determined second type of the selected second web page respectively, is based on at least one of a type or a content of one of the first plurality of elements and a second plurality of elements included in the selected first web page and the selected second web page respectively.

4. The content providing method as claimed in claim 3, wherein based on the one of the determined first type of the selected first web page and the determined second type of the selected second web page being the article web page, a reproduction time of one of the first reconstructed content and the second reconstructed content including the first set of plurality of pages and the second set of plurality of pages respectively, is determined depending on the number of characters in a text of each page of one of the first set of plurality of pages and the second set of plurality of pages.

5. The content providing method as claimed in claim 1, wherein based on one of the determined first type of the selected first web page and the determined second type of the selected second web page being an image web page or a video web page, one of the first reconstructed content and the second reconstructed content includes an image element or a video element extracted based on a source address of the image element or the video element.

6. The content providing method as claimed in claim 1, wherein the first reconstructed content and the second reconstructed content are generated based on source information for the selected first web page and the selected second web page.

7. A display device comprising: a display; an inputter; a memory including; instructions and a processor configured to be connected to the display, the inputter, and the memory to control the display device, wherein the processor is configured to control the display to display a list including a plurality of web pages pre-selected by a user by executing the instructions, and to control the display to sequentially display, based on a user command for selecting at least a first web page and a second web page of the plurality of web pages being input, at least a first reconstructed content and a second reconstructed content corresponding to a determined first type of the selected first web page and a determined second type of the selected second web page respectively;

wherein the first reconstructed content and the second reconstructed content include a first set of plurality of pages and a second set of plurality of pages respectively, obtained by extracting a first set of elements and a second set of elements according to the determined first type of selected the first web page and the determined second type of the selected second web page respectively, among a first plurality of elements and a second plurality of elements included in the selected first web page and the selected second web page respectively, wherein one of the extracted first set of elements and the second set of elements excludes an advertisement element and a pop-up element;

wherein the sequentially displaying of the at least first reconstructed content and the second reconstructed content includes displaying a control menu for controlling reproduction of the at least first reconstructed content and the second reconstructed content together as one content in one region of the display while the at least first reconstructed content and the second reconstructed content are sequentially output in another region of the display.

8. The display device as claimed in claim 7, wherein one of the determined first type of the selected first web page and the determined second type of the selected second web page is determined depending on a domain of one of the selected first web page and the selected second web page.

9. The display device as claimed in claim 7, wherein based on one of the determined first type of the selected first web page and the determined second type of the selected second web page being an article web page, one of the first reconstructed content and the second reconstructed content including the first set of plurality of pages and the second set of plurality of pages respectively, obtained by extracting the first set of elements and the second set of elements according to the determined first type of the selected first web page and the determined second type of the selected second web page respectively, is based on at least one of a type or a content of one of the first plurality of elements and a second plurality of elements included in the selected first web page and the selected second web page respectively.

10. The display device as claimed in claim 7, wherein based on one of the determined first type of the selected first web page and the determined second type of the selected second web page being an image web page or a video web page, one of the first reconstructed content and the second reconstructed content includes an image element or a video element extracted based on a source address of the image element or the video element.

11. The display device as claimed in claim 7, wherein one of the extracted first set of elements and the second set of elements excluding the advertisement element and the pop-up element is related to an article.

* * * * *